US010528908B2

(12) United States Patent
Li

(10) Patent No.: US 10,528,908 B2
(45) Date of Patent: Jan. 7, 2020

(54) AUTOMATIC LOCATION BASED DISCOVERY OF EXTENDED INVENTORY

(71) Applicant: eBay Inc., San Jose, CA (US)

(72) Inventor: Christopher Li, Bellevue, WA (US)

(73) Assignee: eBay Inc., San Jose, CA (US)

(*) Notice: Subject to any disclaimer, the term of this patent is extended or adjusted under 35 U.S.C. 154(b) by 142 days.

(21) Appl. No.: 14/320,374

(22) Filed: Jun. 30, 2014

(65) Prior Publication Data
US 2015/0262117 A1 Sep. 17, 2015

Related U.S. Application Data

(60) Provisional application No. 61/952,061, filed on Mar. 12, 2014.

(51) Int. Cl.
G06Q 10/08 (2012.01)
G06Q 30/08 (2012.01)
G06Q 30/06 (2012.01)
G06Q 30/02 (2012.01)

(52) U.S. Cl.
CPC ........... *G06Q 10/087* (2013.01); *G06Q 30/02* (2013.01); *G06Q 30/06* (2013.01); *G06Q 30/08* (2013.01)

(58) Field of Classification Search
CPC ...... G06Q 10/087; G06Q 30/08; G06Q 30/06; G06Q 30/02
See application file for complete search history.

(56) References Cited

U.S. PATENT DOCUMENTS 5,751,257 A * 5/1998 Sutherland ............. G06F 3/147
235/383
5,786,764 A * 7/1998 Engellenner ......... G06Q 10/087
340/10.42
(Continued)

FOREIGN PATENT DOCUMENTS

CN 101604333 A 12/2009
CN 103502836 1/2014
(Continued)

OTHER PUBLICATIONS

"Korean Application Serial No. 2016-7028260, Office Action dated May 26, 2017", W/ English Translation, 25 pgs.
(Continued)

*Primary Examiner* — Daniel I Walsh
(74) *Attorney, Agent, or Firm* — Schwegman Lundberg & Woessner, P.A.

(57) ABSTRACT

In various example embodiments, systems and methods for automatic location based discovery of variations of displayed items in a store are presented. In some embodiments, a beacon ID associated with a beacon device located at a store is received. In other embodiments, at least one product identifier associated with the beacon ID and representing one or more of store displayed items available for sale by the store is determined. In further embodiments, product variations of the one or more store displayed items available for sale by the store are identified associated with the at least one product identifier. In another embodiment, display information representing the product variations of the one or more store displayed items available for sale by the store is provided.

17 Claims, 19 Drawing Sheets

(56) References Cited

U.S. PATENT DOCUMENTS

| | | | | |
|---|---|---|---|---|
| 6,661,433 B1* | 12/2003 | Lee | ............... | G06T 19/006 235/383 |
| 8,401,914 B1* | 3/2013 | Kim | ............... | G06Q 30/0641 705/26.1 |
| 8,401,915 B1* | 3/2013 | Kim | ............... | G06Q 30/0641 705/26.1 |
| 8,452,868 B2* | 5/2013 | Shafer | ............... | G08B 13/2402 709/224 |
| 8,818,873 B1* | 8/2014 | Kim | ............... | G07G 1/0081 705/16 |
| 8,866,673 B2* | 10/2014 | Mendelson | ............... | G01C 21/206 342/386 |
| 10,009,301 B1* | 6/2018 | Cheng | ............... | H04W 4/80 |
| 10,034,268 B1* | 7/2018 | Hazlewood | ............... | H04W 4/02 |
| 10,102,558 B2* | 10/2018 | Koo Tze Mew | .. | G06Q 30/0631 |
| 10,251,018 B1* | 4/2019 | Susel | ............... | H04W 4/02 |
| 2002/0082921 A1* | 6/2002 | Rankin | ............... | G06Q 20/12 705/14.35 |
| 2002/0135515 A1* | 9/2002 | Rankin | ............... | G08G 1/0962 342/385 |
| 2002/0170961 A1* | 11/2002 | Dickson | ............... | G06K 7/0008 235/383 |
| 2002/0186133 A1* | 12/2002 | Loof | ............... | G06Q 20/20 340/572.1 |
| 2002/0194141 A1* | 12/2002 | Langensteiner | ....... | G06Q 20/02 705/67 |
| 2004/0054752 A1* | 3/2004 | Takagi | ............... | G06Q 30/02 709/217 |
| 2004/0080530 A1* | 4/2004 | Lee | ............... | G06T 19/006 715/738 |
| 2004/0205512 A1* | 10/2004 | Hoover | ............... | G06F 17/2241 715/202 |
| 2004/0212480 A1* | 10/2004 | Carrender | ............... | G06K 7/0008 340/10.42 |
| 2005/0073648 A1* | 4/2005 | Toshima | ............... | A61B 3/10 351/200 |
| 2005/0149414 A1* | 7/2005 | Schrodt | ............... | G06Q 10/087 705/29 |
| 2005/0167493 A1* | 8/2005 | Barton | ............... | A47F 9/047 235/383 |
| 2007/0159298 A1* | 7/2007 | Zegelin | ............... | G06K 17/0022 340/5.91 |
| 2007/0228163 A1* | 10/2007 | Schon | ............... | G06Q 10/06 235/383 |
| 2007/0288332 A1* | 12/2007 | Naito | ............... | G06Q 30/06 705/27.2 |
| 2008/0136598 A1* | 6/2008 | Chen | ............... | G06K 7/0008 340/10.1 |
| 2008/0139306 A1* | 6/2008 | Lutnick | ............... | G06Q 30/02 463/30 |
| 2008/0208753 A1* | 8/2008 | Lee | ............... | G06Q 20/045 705/51 |
| 2008/0245863 A1 | 10/2008 | Buchheit | | |
| 2008/0257948 A1* | 10/2008 | Jochim | ............... | G06Q 20/401 235/375 |
| 2009/0006196 A1* | 1/2009 | Barkan | ............... | G06K 7/10881 705/14.34 |
| 2009/0055278 A1* | 2/2009 | Nemani | ............... | G06Q 20/204 705/17 |
| 2009/0059175 A1* | 3/2009 | Le Quesne | ............... | G06F 3/042 353/28 |
| 2009/0231135 A1* | 9/2009 | Chaves | ............... | G06Q 10/087 340/572.1 |
| 2010/0205000 A1 | 8/2010 | Cho | | |
| 2011/0000963 A1* | 1/2011 | Mercado | ............... | G06Q 10/10 235/383 |
| 2011/0025462 A1* | 2/2011 | Stern | ............... | G06K 7/0008 340/10.1 |
| 2011/0072132 A1* | 3/2011 | Shafer | ............... | G08B 13/2402 709/224 |
| 2011/0099061 A1* | 4/2011 | Giffin | ............... | G06Q 30/02 705/14.49 |
| 2011/0205125 A1* | 8/2011 | Lin | ............... | G01S 5/0236 342/451 |
| 2011/0227791 A1* | 9/2011 | Lin | ............... | G01S 5/02 342/386 |
| 2011/0288938 A1* | 11/2011 | Cook | ............... | G06Q 30/0251 705/14.66 |
| 2011/0320293 A1* | 12/2011 | Khan | ............... | G06Q 20/0457 705/16 |
| 2012/0016780 A1 | 1/2012 | Lee et al. | | |
| 2012/0166241 A1* | 6/2012 | Livingston | ............... | G06Q 30/00 705/7.12 |
| 2012/0286031 A1* | 11/2012 | Rothschild | ............... | G06K 19/06056 235/375 |
| 2012/0322459 A1* | 12/2012 | Jaffri | ............... | G01S 5/0018 455/456.1 |
| 2013/0030953 A1* | 1/2013 | Marsic | ............... | G06Q 30/06 705/26.7 |
| 2013/0217333 A1 | 8/2013 | Sprigg et al. | | |
| 2013/0339151 A1* | 12/2013 | Bottine | ............... | H04W 4/008 705/14.64 |
| 2013/0339185 A1 | 12/2013 | Johnson | | |
| 2014/0040041 A1* | 2/2014 | Ohnemus | ............... | G06Q 30/0627 705/14.66 |
| 2014/0100996 A1* | 4/2014 | Klein | ............... | G06Q 30/0643 705/27.2 |
| 2014/0129354 A1* | 5/2014 | Soon-Shiong | ............... | G06Q 30/06 705/16 |
| 2014/0164158 A1* | 6/2014 | Nevada | ............... | G06Q 30/0601 705/26.1 |
| 2014/0236728 A1* | 8/2014 | Wright | ............... | G06Q 30/0272 705/14.58 |
| 2014/0263635 A1* | 9/2014 | Jones | ............... | G06Q 10/087 235/385 |
| 2014/0279241 A1* | 9/2014 | Bartholomew | .... | G06Q 30/0623 705/26.61 |
| 2014/0365334 A1* | 12/2014 | Hurewitz | ............... | G06Q 30/0613 705/26.41 |
| 2015/0005011 A1* | 1/2015 | Nehrenz | ............... | H04W 4/02 455/456.3 |
| 2015/0012394 A1* | 1/2015 | Rossi | ............... | G06Q 30/0643 705/27.2 |
| 2015/0029945 A1* | 1/2015 | Do | ............... | H04W 76/02 370/329 |
| 2015/0058142 A1* | 2/2015 | Lenahan | ............... | G06Q 30/0631 705/16 |
| 2015/0072618 A1* | 3/2015 | Granbery | ............... | H04W 4/21 455/41.2 |
| 2015/0079942 A1* | 3/2015 | Kostka | ............... | H04W 4/21 455/411 |
| 2015/0081474 A1* | 3/2015 | Kostka | ............... | H04W 4/21 705/26.8 |
| 2015/0112790 A1* | 4/2015 | Wolinsky | ............... | G06Q 30/0238 705/14.38 |
| 2015/0120504 A1* | 4/2015 | Todasco | ............... | G06Q 20/322 705/26.61 |
| 2015/0134374 A1* | 5/2015 | Schulz | ............... | H04W 4/80 705/5 |
| 2015/0191341 A1* | 7/2015 | Martindale | ............... | B67D 1/0888 222/1 |
| 2015/0201306 A1* | 7/2015 | Kazemi | ............... | H04W 4/022 455/456.1 |
| 2015/0227890 A1* | 8/2015 | Bednarek | ............... | G06Q 10/08355 705/26.81 |
| 2015/0242764 A1* | 8/2015 | Subbaraj | ............... | G06Q 10/02 705/5 |
| 2015/0242922 A1* | 8/2015 | Zamer | ............... | G06Q 30/0623 705/26.61 |
| 2015/0262117 A1* | 9/2015 | Li | ............... | G06Q 10/087 235/385 |
| 2015/0262288 A1* | 9/2015 | Cypher | ............... | G06Q 30/0251 705/27.2 |
| 2015/0278866 A1* | 10/2015 | Levi | ............... | G06Q 30/0261 705/14.58 |
| 2015/0278928 A1* | 10/2015 | Nichols | ............... | G06Q 30/0639 705/26.9 |

(56) References Cited

U.S. PATENT DOCUMENTS

| | | | | |
|---|---|---|---|---|
| 2015/0294398 | A1* | 10/2015 | Khalid | G06Q 30/0631 705/26.7 |
| 2015/0296347 | A1* | 10/2015 | Roth | H04W 4/04 705/326 |
| 2015/0317708 | A1* | 11/2015 | Eramian | G06Q 30/06 705/26.8 |
| 2015/0348049 | A1* | 12/2015 | Todasco | G06Q 10/02 705/5 |
| 2015/0379549 | A1* | 12/2015 | Hwang | G06Q 30/0226 705/14.27 |
| 2015/0379576 | A1* | 12/2015 | Otis | G06Q 30/0261 705/14.53 |
| 2016/0019526 | A1* | 1/2016 | Granbery | G06Q 20/327 705/26.81 |
| 2016/0055538 | A1* | 2/2016 | Todasco | G06Q 30/0269 705/14.58 |
| 2016/0078512 | A1* | 3/2016 | Yopp | G06Q 30/0613 705/26.41 |
| 2016/0086029 | A1* | 3/2016 | Dubuque | G06K 9/00536 382/159 |
| 2016/0092966 | A1* | 3/2016 | Vigier | G06Q 30/0633 705/26.8 |
| 2016/0171486 | A1* | 6/2016 | Wagner | G06Q 20/12 705/39 |
| 2016/0171540 | A1* | 6/2016 | Mangipudi | G06Q 30/0255 705/14.53 |
| 2016/0259955 | A1* | 9/2016 | Berlin | G06Q 30/02 |
| 2016/0275590 | A1* | 9/2016 | Todasco | G06Q 30/0631 |
| 2017/0017994 | A1* | 1/2017 | Walden | G06Q 30/0261 |
| 2017/0061490 | A1* | 3/2017 | Ghahremani | G06Q 30/0261 |
| 2017/0064667 | A1* | 3/2017 | Mycek | H04B 17/318 |
| 2017/0079001 | A1* | 3/2017 | Lewis | H04W 64/006 |
| 2017/0243273 | A1* | 8/2017 | Ward, Jr. | G06Q 30/0623 |
| 2017/0286818 | A1* | 10/2017 | Censi | G06K 7/10425 |
| 2018/0160282 | A1* | 6/2018 | van de Poll | G06K 9/00778 |
| 2018/0197196 | A1* | 7/2018 | Cho | G06Q 30/02 |

FOREIGN PATENT DOCUMENTS

| | | |
|---|---|---|
| CN | 106415624 A | 2/2017 |
| JP | 2003016351 A | 1/2003 |
| KR | 1020090054501 A | 6/2009 |
| KR | 1020130114641 A | 10/2013 |
| TW | 201349152 | 12/2013 |
| WO | WO-2015138645 A1 | 9/2015 |

OTHER PUBLICATIONS

"Korean Application Serial No. 2016-7028260, Response filed Jul. 26, 2017 to Office Action dated May 26, 2017", W/ English Claims, 28 pgs.

Voluntary Amendment for Chinese Patent Application No. 201580027116.7, filed on May 23, 2017, 40 pages ( 20 pages Official Copy and 20 pages English Translation).

Office Action received for Korean Patent Application No. 2016-7028260, dated Nov. 15, 2015, 10 pages (3 pages of English Translation and 7 pages of Official Copy).

Response to Office Action filed on Jan. 15, 2018 for Korean Patent Application No. 2016-7028260, dated Nov. 15, 2015, 26 pages (22 pages of Official Copy and 4 pages of Pending Claims).

International Preliminary Report on Patentability received for PCT Application No. PCT/US2015/020023, dated Sep. 22, 2016, 7 pages.

Final Office Action received for Korean Patent Application No. 10-2016-7028260, dated Nov. 15, 2017, 10 pages (3 pages of English Translation and 7 pages of Official Copy).

Response to Final Office Action filed on Jan. 15, 2018 for Korean Patent Application No. 10-2016-7028260, dated Nov. 15, 2017, 26 pages (22 pages of Official Copy and 4 pages of Pending Claims).

Office Action received for Korean Patent Application No. 10-2018-7012562, dated May 11, 2018, 13 pages (6 pages of English Translation and 7 pages of Official Copy).

Korean Application Serial No. 10-2018-7012562, Response filed Jul. 11, 2018 to Notice of Preliminary Rejection dated May 11, 2018, 24 pages ( with English Translation).

"Chinese Application Serial No. 201580027116.7, Office Action dated Jan. 18, 2019", w English translation, 36 pgs.

"International Application Serial No. PCT/US2015/020023, International Search Report dated Jun. 8, 2015", 2 pgs.

"International Application Serial No. PCT/US2015/020023, Written Opinion dated Jun. 8, 2015", 5 pgs.

Response to Office Action filed on May 30, 2019, for Chinese Patent Application No. 201580027116.7, dated Jan. 18, 2019, 10 pages(4 pages of English Translation and 6 pages of Official Copy).

Office Action received for Korean Patent Application No. 10-2019-7005408, dated Apr. 5, 2019, 10 pages (4 Pages of English Translation and 10 pages of Official Copy).

Response to Office Action filed on Jun. 5, 2019, for Korean Patent Application No. 10-2019-7005408, dated Apr. 5, 2019, 16 pages ( 3 pages of English Translation and 13 pages of Official copy).

Office Action received for Chinese Patent Application No. 201580027116.7, dated Jul. 31, 2019, 34 pages (20 pages English translation and 14 pages original copy).

* cited by examiner

USER DEVICE 300

BEACON ID PRODUCT IDENTIFIER MAPPING TABLE 750

| Displayed Item 755 | Beacon Proximity UUID (Merchant Store) 751 | Beacon Major UUID 752 (Display Shelf) | Beacon Minor UUID 753 (Displayed Item) | Product Identifier 754 |
|---|---|---|---|---|
| Item 1 | 23542266-18D1-4FE4-84A1-23F819589D39 | 1 | 1 | Item 1.12 |
| Item 2 | 23542266-18D1-4FE4-84A1-23F819589D39 | 1 | 2 | Item 2.15 |
| Item 3 | 23542266-18D1-4FE4-84A1-23F819589D39 | 1 | 3 | Item 3.14 |
| Item 4 | 23542266-18D1-4FE4-84A1-23F819589D39 | 1 | 4 | Item 4.12 |

*FIG. 7B*

EXTENDED INVENTORY TABLE 770

| Product Identifier 771 | Attribute 1 772 (color) | Attribute 2 773 (size) | Available in Store Inventory 774 | Available Online 775 |
|---|---|---|---|---|
| Item 4.01 | Fuchsia | 6 | | |
| Item 4.02 | Fuchsia | 7 | x | x |
| Item 4.03 | Fuchsia | 8 | | x |
| Item 4.04 | Fuchsia | 9 | x | |
| Item 4.05 | Fuchsia | 10 | | x |
| Item 4.06 | Black | 6 | | x |
| Item 4.07 | Black | 7 | x | x |
| Item 4.08 | Black | 8 | x | x |
| Item 4.09 | Black | 9 | | x |
| Item 4.10 | Black | 10 | | x |
| Item 4.11 | Orange | 6 | | |
| Item 4.12 | Orange | 7 | x | x |
| Item 4.13 | Orange | 8 | x | |
| Item 4.14 | Orange | 9 | x | x |
| Item 4.15 | Orange | 10 | | |
| Item 4.16 | Beige Patent | 6 | | x |
| Item 4.17 | Beige Patent | 7 | | |
| Item 4.18 | Beige Patent | 8 | x | x |
| Item 4.19 | Beige Patent | 9 | x | x |
| Item 4.20 | Beige Patent | 10 | | x |

*FIG. 7C*

AUTOMATIC LOCATION BASED DISCOVERY OF EXTENDED INVENTORY

RELATED APPLICATION

This application claims the benefit of priority to U.S. Provisional Patent Application Ser. No. 61/952,061, filed on Mar. 12, 2014, which is incorporated by reference herein in its entirety.

TECHNICAL FIELD

Embodiments of the present disclosure relate generally to merchant stores, and more particularly, but not by way of limitation, to inventory systems for customers at merchant stores.

BACKGROUND

The concept "Store of the Future" involves multiple shopping channels seamlessly integrating online and offline sales channels that create personal, relevant experiences for customers. Retailers are now focused on the total customer experience across all selling environments. The various shopping channels available today include physical stores, websites, online catalogues, social media, mobile apps, POS & payment systems, digital screens, touch screens and tablets.

Some stores which have been traditionally known as brick-and-mortar businesses (with physical presence) also have online shopping sites today. Other businesses have an Internet-only presence, such as online stores, which have no physical presence for shoppers to visit and buy from directly. In today's marketplace, physical stores often compete with online stores. Online stores often offer competitively priced products and allow consumers to compare pricing and availability from merchants located anywhere. Furthermore, online shopping may be conducted from almost anywhere, for example, from a consumer's home or even from within an aisle of a store in which a consumer is viewing a product. Although local merchants having physical stores offer many advantages to consumers (such as first hand inspection of a look and feel of a product, immediate availability of a purchased product and no shipping costs, and face-to-face customer service), local merchants continually work on enhancing the in-store shopping experience to draw consumers into physical stores.

BRIEF DESCRIPTION OF THE DRAWINGS

The appended drawings merely illustrate example embodiments of the present disclosure and cannot be considered as limiting its scope.

FIG. 7B illustrates a beacon ID product identifier mapping table, according to an example embodiment.

FIG. 7C illustrates an extended inventory table, according to an example embodiment.

DETAILED DESCRIPTION

Example methods and systems for automatic location based discovery of extended inventory of displayed items in merchant stores are described. In the following description, for purposes of explanation, numerous specific details are set forth in order to provide a thorough understanding of example embodiments. It will be evident, however, to one skilled in the art that embodiments of the present disclosure may be practiced without these specific details.

Physical stores often have a limited display area and cannot display all variations of items sold in the store, including variations in color, size, or other attributes. Furthermore, customers may need to rely on merchant sales persons to describe the variations and availability of items displayed, and to bring these items out from the inventory room for the customer to inspect or try on. Customers often carry their mobile devices when they shop at physical merchant stores and may find it convenient to be able to view all variations of an item on display, as well as inventory for that merchant, both in-store and online, before engaging with a merchant sales person.

According to various example embodiments, based on location information, a mobile device of a customer may automatically discover variations of a displayed item, and these variations of the displayed item may be presented to the customer on the mobile device. The customer can then select the variations of the displayed item he/she is interested in viewing or trying on, and can request via the mobile device that one of the merchant sales persons bring these items out from the inventory room. The automatic discovery of the displayed items also allows the merchant system to recommend other items in the physical store to the customer, as well as similar items or complementary items, such as accessories.

Example Merchant Store

Figure 1:
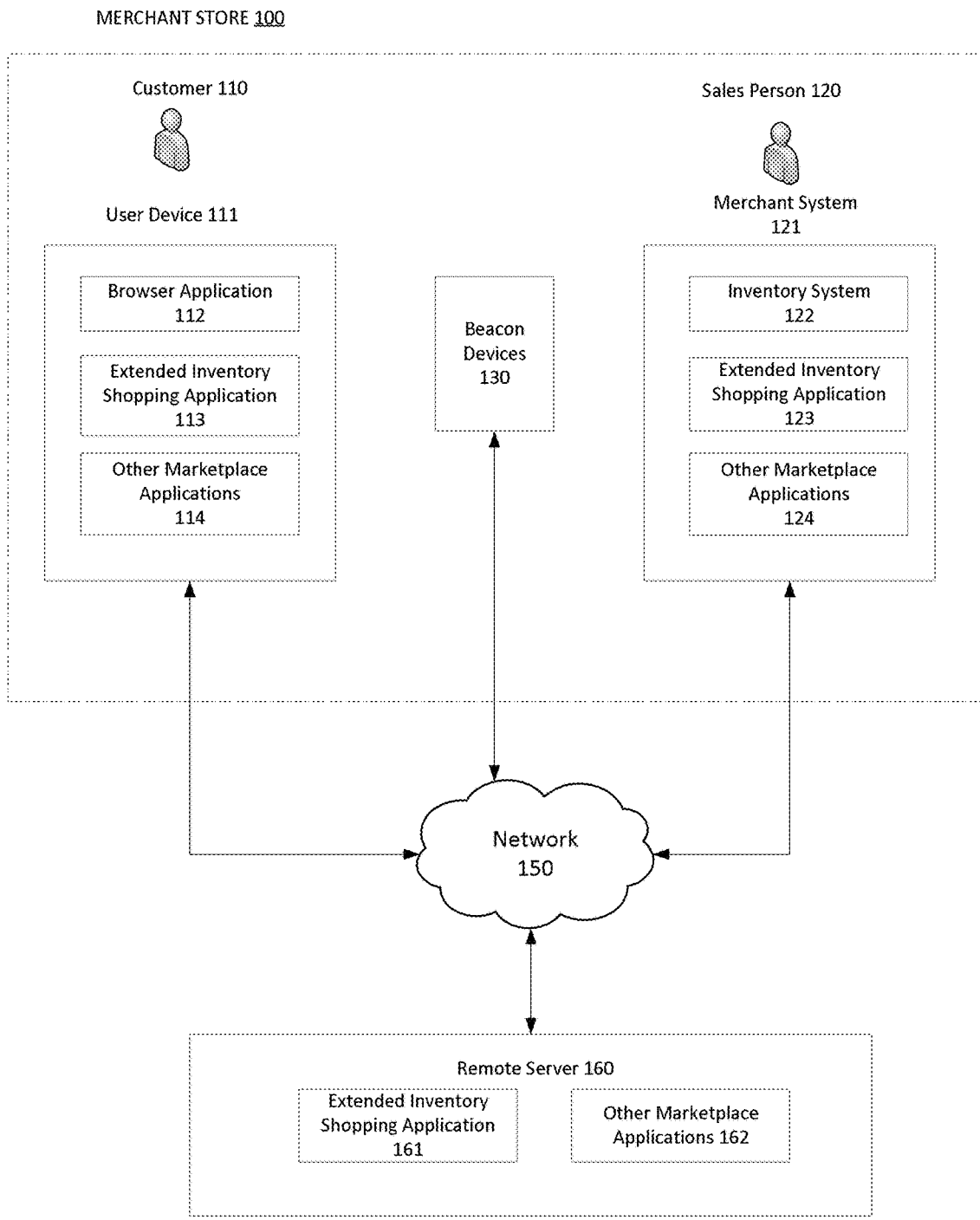
FIG. 1 is a diagram illustrating an environment of a system for automatic discovery of extended inventory at a merchant store, according to various embodiments.

FIG. 1 is a diagram illustrating a merchant store 100 for displaying items for sale to customers, according to various embodiments. The merchant store 100 may include a user device 111, beacon devices 130, a merchant system 121, and a remote server 160, all in communication over a network 150. In various embodiments, the number of the beacon devices 130 located within the merchant store 100 may vary. In example embodiments, the beacon devices 130 may be any type of wireless geo-location tracking devices, using Bluetooth™LE (BLE) or other communications protocols, that can be used for automatically discovering displayed items near a customer 110 within the merchant store 100, such that the customer 110 may view variations of the displayed items (e.g., different sizes or colors) on the user device 111. Extended inventory of displayed items may also be automatically discovered using location based information, such as geo-location information transmitted by the beacon devices 130. In addition to sending and receiving signals via BLE and other near-range communications protocols, the beacon devices 130 may also send and receive signals via wireless communication systems, such as Wi-Fi or cellular phone networks.

The network 150, in one embodiment, may be implemented as a single network or a combination of multiple networks. For example, in various embodiments, network 150 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet. In various embodiments, the network 150 may be extended to reside within the merchant store 100, such that the merchant system 121 and the user device 111 may communicate over a wireless network. In various embodiments, the user device 111 may be a BLE communications protocol enabled device or enabled for other wireless short range communications protocol.

In example embodiments, the user device 111 may be used to log in or check in to an extended inventory shopping application 113, receive display information, and request a sales person 120 to retrieve extended inventory. In further embodiments, user device 111 may send and/or receive a beacon ID, mobile UUID, item information and/or item recommendations. In various embodiments, content may be displayed by particular applications or "apps" stored in a memory of the user device 111 and executed by one or more processors executing in the user device 111. The user device 111 may include mobile apps downloaded and residing on the user device 111 to enable the customer 110 to access content through the downloaded mobile apps, such as the extended inventory shopping application 113 and the other marketplace applications 114. One example of an application is a browser application 112 that displays content, such as a web page or a user interface, using a browser that may be used to access extended inventory shopping application 113 and other marketplace applications 114.

In example embodiments, the merchant system 121 includes an inventory system 122, an extended inventory shopping application 123, and other marketplace applications 124. The inventory system 122 tracks inventory of products sold at the merchant store 100 and/or at an online merchant store using inventory information. The inventory system 122 may be located at the merchant store 100 and communicatively coupled to other merchant devices (not shown), such as POS devices and/or other devices known in the art that may be used to update inventory information. In alternative embodiments, the inventory system 122 may be provided (partially or completely) at a location that is remote from the merchant store 100 and may be communicatively coupled through the network 150 to the merchant devices (not shown) such as POS devices and/or other devices for updating inventory information.

Inventory information stored in the inventory system 122 may be updated in real time using merchant devices. The inventory information may be stored in one or more inventory databases, communicatively coupled to merchant devices, within the inventory system 122, residing locally within the merchant store 100 or remotely in the remote server 160. In example embodiments, the one or more inventory databases include a beacon ID product identifier mapping table 750, shown in FIG. 7B, and an extended inventory table 770, shown in FIG. 7C. The mapping table 750 provides a mapping from the beacon ID to one or more displayed items for sale, which are identified by a product identifier. The extended inventory table 770 provides one or more variations of a displayed item for sale, either in-store or online. In example embodiments, merchant devices may receive a request from the user device 111 to retrieve extended inventory available at the merchant store 100 for the customer 110 to view and/or try on.

During the process of setting up items for display at the merchant store 100, the merchant may update the mapping table 750 to associate the beacon devices 130 with one or more displayed items by associating a beacon ID with one or more product identifiers. The beacon ID product identifier mapping table 750 illustrates a one-to-one mapping of a beacon device and a displayed item. However, in alternative embodiments, more than one displayed item may be associated with a single beacon device.

The merchant system 121 also includes a physical location (not shown) where in-store inventory may be stored within the merchant store 100 that may be retrieved by the sales person 120. The extended inventory may include in-store inventory and online inventory of the product variations (based on product attributes) available for sale. The merchant system 121 also includes one or more merchant devices (not shown) that enable the sales person 120 to receive a request from the customer 110 via the user device 111 to retrieve one or more variations of products selected by the customer 110 to view and/or try on.

In various embodiments, the remote server 160, located within a cloud environment (not shown), may provide software as a service to the merchant system 121 and/or the user device 111, where an extended inventory shopping application 161 and other marketplace applications 162 run on the remote server 160. The extended inventory shopping application 161 and other marketplace applications 162, which includes applications related to the selling and buying of items (e.g., goods or services) may be hosted on dedicated or shared server machines (not shown) that are communicatively coupled to enable communications between the server machines.

The merchant system 121 and/or the user device 111 may access the software-as-a-service through a client device while cloud providers manage the infrastructure and platforms that run the software applications (e.g., the extended inventory shopping application 161 and the other marketplace applications 162). Further, the user device 111 and the merchant system 121 may represent client devices that are capable of accessing software-as-a-service from a cloud environment.

In alternative embodiments, the merchant system 121 may include a local server (not shown) for executing the extended inventory shopping application 161 and the other marketplace applications 162 locally rather than accessing the remote server 160 through the network 150. In example embodiments, the local server may provide a back-up service to the remote server 160 when the Internet is down or other network-related interruptions occur. In alternative embodiments, applications may be served to the user device 111 and the merchant system 121 primarily by the local server, while one or more servers and databases within a cloud environment are accessed by the local server to update content and perform commit transactions.

In various embodiments, the merchant store 100 includes beacon devices 130 or other wireless near range communication devices for enabling communications between the user device 111 and/or the merchant system 121 to discover displayed items and their variations using geo-location information (or other product identifiers such as bar codes and QR codes). The beacon devices 130 are installed at various locations throughout the merchant store 100 such that items displayed for sale can be automatically discovered using location information. Once the customer 110 checks in (implicitly or explicitly) to the extended inventory shopping application 113, displayed items in close proximity to the beacon devices 130 may be discovered by the extended inventory shopping application 113. The beacon ID and/or the mobile UUID may be used to identify item information of the displayed items and available variations in the extended inventory. The item information of the displayed items and available variations in the extended inventory may be displayed on the user device 111.

The user device 111 may be enabled to communicate with the beacon devices 130 using BLE communications protocol when the user device 111 is within the communication zones of the beacon devices 130 in example embodiments. In alternative embodiments, other communication protocols may be used by the beacon devices 130 to transmit location information. The user device 111, which is capable of communicating with the beacon devices 130, may be referred to as a beacon enabled user device 111. In an example embodiment, the beacon devices 130 using BLE communications protocol may have a communications range of about 50 meters or about 160 feet and may be able to discover (and may subsequently check in) the user device 111 within this range.

The beacon devices 130 may represent small sensors placed inside a physical space (for example, a merchant store 600 shown in FIG. 6 with beacon devices 601-614 positioned near displayed shoes) that are capable of transmitting and receiving data to and from the beacon enabled user device 111, the merchant system 121 and/or the remote server 160. The beacon devices 130 may take on a variety of form factors. The discovery, handshaking and communications of BLE communication protocol with the beacon devices 130 may be handled by the user device 111 in example embodiments. Information provided by the beacon devices 130 can be used to identify item information of displayed items near the user device 111 of the customer 110, and to connect the user device 111 to a service or to content provided by servers (e.g., remote server 160) or other computing devices (e.g., within the merchant system 121), located locally or remotely in a cloud or other computing environment.

The beacon devices 130 may transmit one or more sequences of information to the user device 111 to provide proximity information, or content and instructions to the user device 111 to perform an action. In other words, the beacon enabled user device 111 may receive personalized location-based notifications, information and actions while within the communications range of one or more of the beacon devices 130 within the merchant store 100. By way of example, the beacon devices 130 may be iBeacons available from Apple Inc. of Cupertino, Calif., or PayPal beacons available from eBay Inc. of San Jose, Calif.

The remote server 160, according to some embodiments, may be a server that hosts the extended inventory shopping application 161 and the other marketplace applications 162 that may provide a number of marketplace functions and services to the customer 110 and the sales person 120 within the merchant store 100.

In example embodiments, the remote server 160 may be located in a cloud computing environment (not shown) that provides software and hardware resources via the Internet, and delivers applications, such as the extended inventory shopping application 161 and the other marketplace applications 162, running on the cloud infrastructure, to the user device 111 and/or the merchant system 121 over the Internet. The extended inventory shopping application 161 and the other marketplace applications 162 may be web-based and delivered on demand as a service (also referred to software-as-a-service (SaaS)) to the user device 111 and/or the merchant system 121 over the Internet. The extended inventory shopping application 161 and the other marketplace applications 162 may be accessed by the customer 110 through mobile apps (e.g., the extended inventory shopping application 113 and the other marketplace applications 114) or the browser application 112 installed on the user device 111.

The remote server 160 may also include an account database (not shown) that includes account information for the customer 110 having an account on the remote server 160. The account information may be used, alone or together with other information (e.g., the items near the customer 110 or selected by the customer 110), to personalize product recommendations, such as through messages "OTHER ITEMS IN THE STORE OR ONLINE" in the upper portion 420 of user device 300 (FIG. 4) and "YOU MIGHT ALSO LIKE" in display element 550 of user device 300 (FIG. 5), based on the account information.

Example User Device

Figure 3:
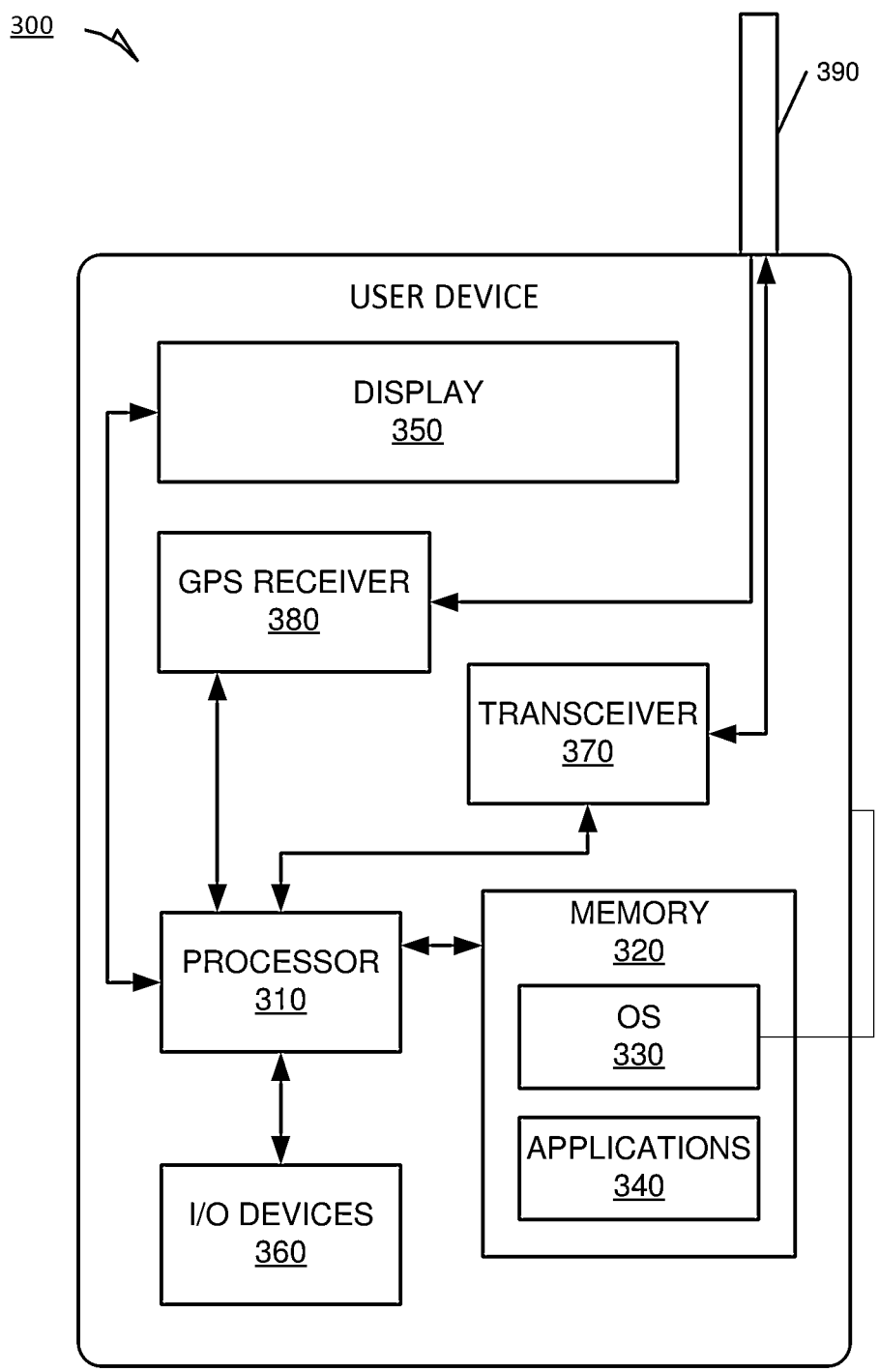
FIG. 3 is a block diagram illustrating a user device, according to an example embodiment.

FIG. 3 is a block diagram illustrating a user device 300, according to an example embodiment. The user device 111 may implemented with the user device 300 in an example embodiment. In some embodiments, the user device 300 may be a mobile device such as a smartphone, and in alternative embodiments, the user device 300 may be a tablet computer, personal computer, laptop computer, netbook, set-top box, video game console, head-mounted display (HMD) or other wearable computing device. In example embodiments, the user device 300 may be a beacon enabled user device capable of communicating using BLE or other short-range wireless communications protocols. The user device 300 may include a processor 310, which may be any of a variety of different types of commercially available processors suitable for mobile devices (for example, an XScale architecture microprocessor, a Microprocessor without Interlocked Pipeline Stages (MIPS) architecture processor, or another type of processor). In example embodiments, the processor 310 may be implemented with one or more central processing units (CPUs), micro-controllers, graphics processing units (GPUs) and/or digital signal processors (DSPs).

A memory 320, such as a Random Access Memory (RAM), a Flash memory, or another type of memory, is typically accessible to the processor 310. The memory 320 may be adapted to store an operating system (OS) 330, as well as applications 340, such as the browser application 112, the extended inventory shopping application 113, and the other marketplace applications 114.

Figure 4:
FIG. 4 illustrates a user device presenting displayed items automatically discovered based on location to a customer, according to an example embodiment.
Figure 5:
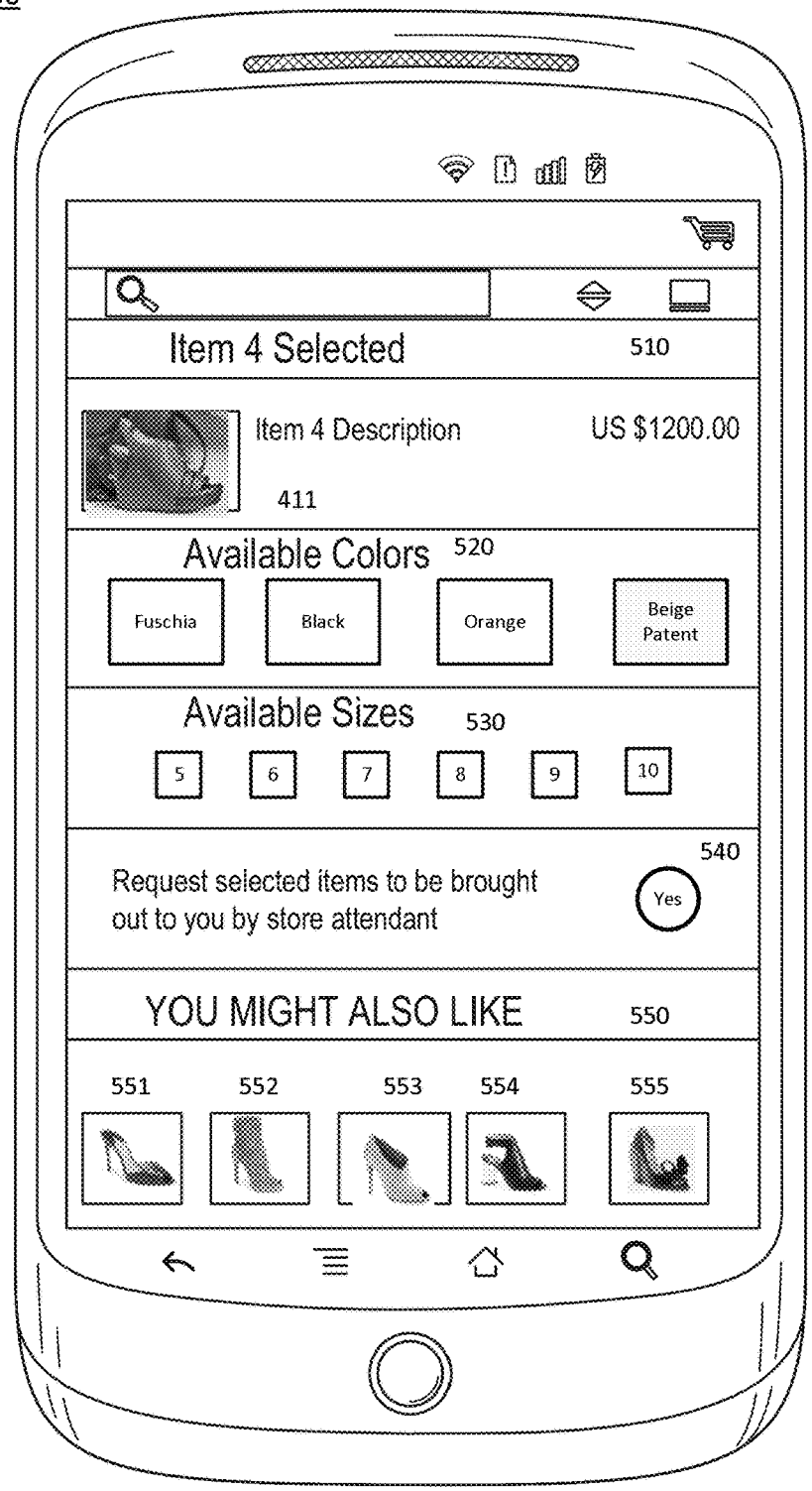
FIG. 5 illustrates a user device presenting displayed items automatically discovered based on location, according to an example embodiment.

The processor 310 may be coupled, either directly or via appropriate intermediary hardware, to a display 350 and to one or more input/output (I/O) devices 360, such as a keypad, a touch panel sensor, a microphone and the like. FIGS. 4 and 5 illustrate automatically discovered items based on location information, and other recommended items, that are presented to a customer, such as customer 110, on the display 350 in example embodiments. I/O devices 360 may allow the customer to select displayed items near the customer or other items in the store (for example, items suggested by messages "ITEMS NEAR YOU" in the upper portion 410 of the user device 300 or "OTHER ITEMS IN THE STORE OR ONLINE" in the lower portion 420 of the user device 300, shown in FIG. 4); select variations of the selected displayed item (for example, variations suggested by "AVAILABLE COLORS" in display element 520 and "AVAILABLE SIZES" in display element 530 shown in FIG. 5); and/or request items from the store inventory to be brought out to the customer, according to example embodiments.

Additionally, the user device 300 may include a camera module (not shown) for acquiring and processing images. In various embodiments, the camera module may be used to scan QR codes, bar codes or other available codes for identifying item information. The information from these codes may represent, and/or be converted to or associated with, product identifiers, to identify displayed products and extended inventory. In example embodiments, the QR codes and bar codes may be used instead of the beacon devices 130 to identify products.

Similarly, in some embodiments, the processor 310 may be coupled to a transceiver 370 that interfaces with an antenna 390. The transceiver 370 may be configured to both transmit and receive cellular network signals, wireless data signals, or other types of signals via the antenna 390, depending on the nature of the user device 300. In this manner, a connection between the user device 300 and the network 150 may be established. Further, in some configurations, a GPS receiver 380 may also make use of the antenna 390 to receive GPS signals. For a beacon enabled user device 300, the transceiver 370 is configured to receive and send data packets from and to the beacon devices 130 using BLE or other wireless short-range communications protocols.

Example Beacon Device

Figure 7A:
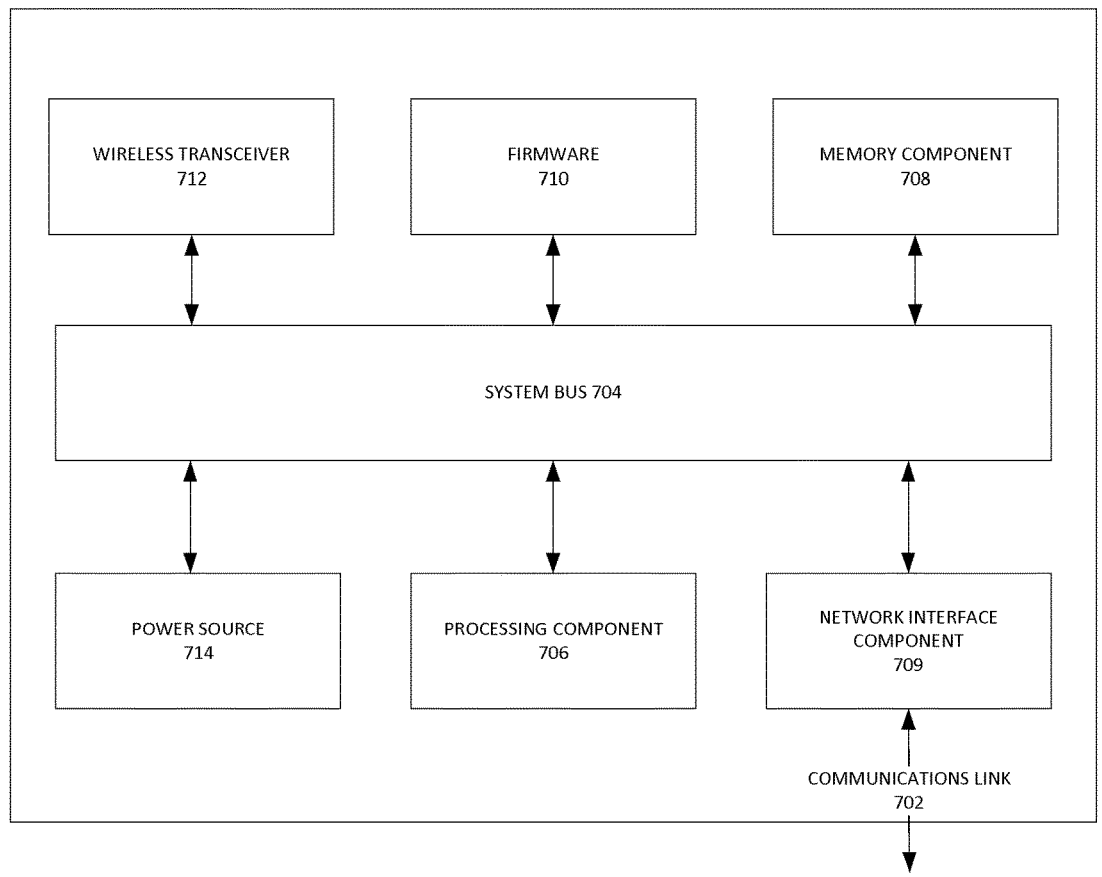
FIG. 7A is a block diagram illustrating an example embodiment of a beacon device.

FIG. 7A is a diagram illustrating a beacon device 700, according to various embodiments. The beacon devices 130, shown in FIG. 1, may be implemented using multiple beacon devices 700 in an example embodiment. As shown in FIG. 7A, the beacon device 700 may include a network interface component (NIC) 709 configured for communication with a network, such as the network 150, shown in FIG. 1. In some embodiments, the NIC 709 may include a wireless communication component, such as a wireless broadband component, a wireless satellite component, or various other types of wireless communication components including radio frequency (RF), microwave frequency (MWF), and/or infrared (IR) components configured for communication with the network 150 over a communications link 702. In other embodiments, NIC 709 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with the network 150.

The beacon device 700 may also include a system bus 704 for interconnecting and facilitating communications among various components within beacon device 700. Such components include a processing component 706, which may be one or more processors, micro-controllers, graphics processing units (GPUs) or digital signal processors (DSPs); a memory component 708; firmware 710; and one or more wireless transceivers 712 that may each include an antenna that is separable or integral and is capable of transmitting and receiving information according to one or more wireless network protocols, such as Wi-Fi™, 3G, 4G, HDSPA, LTE, RF, NFC, IEEE 802.11a, b, g, n, ac, or ad, Bluetooth®, BLE, WiMAX, ZigBee®, etc. In some embodiments, a wireless transceiver 712 may comprise a BLE transceiver configured to transmit and receive information according to the BLE communications protocol. The beacon device 700 may also include a power source 714. The power source 714 may be any power source capable of providing sufficient current to power the components of the beacon device 700. In some embodiments, the power source 714 may be a battery, such as a watch battery or button cell.

Figure 6:
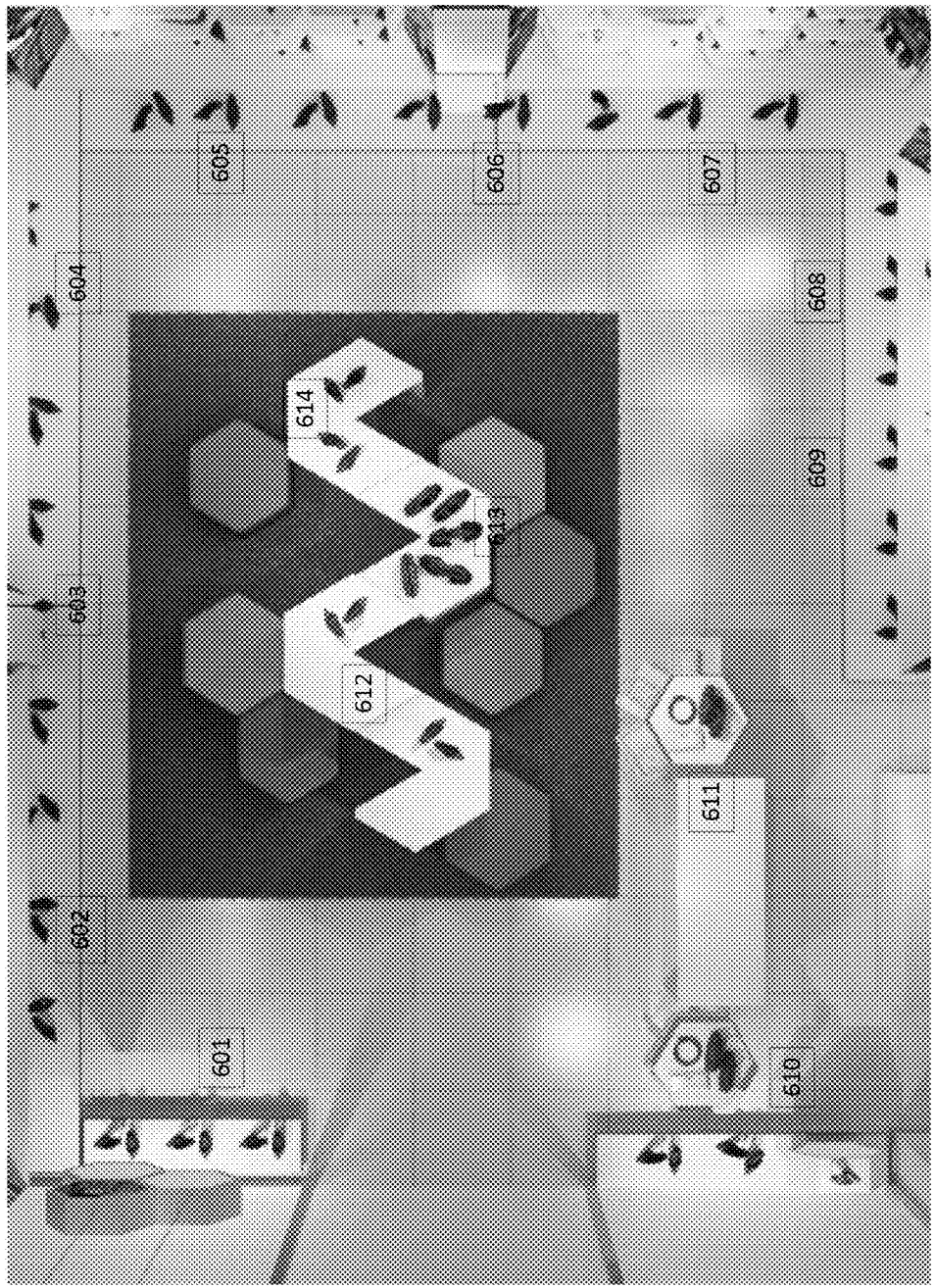
FIG. 6 illustrates an example embodiment of an aerial view of a merchant store displaying multiple items.

The beacon device 700 may be a dedicated hardware device running Bluetooth 4.0 LE. In an example embodiment, a user device 111 having a beacon-enabled app may be notified when the user device 111 moves in and out of range of the beacon devices 700 and may monitor the distance between the beacon devices 700 and the user device 111 as it changes over time. In various embodiments, beacon devices 201-213 (shown in FIG. 2) and the beacon devices 601-614 (shown in FIG. 6) may be implemented using the beacon device 700, and may be positioned within the merchant store 100, as shown in FIGS. 2 and 6, near items displayed for sale.

Figure 2:
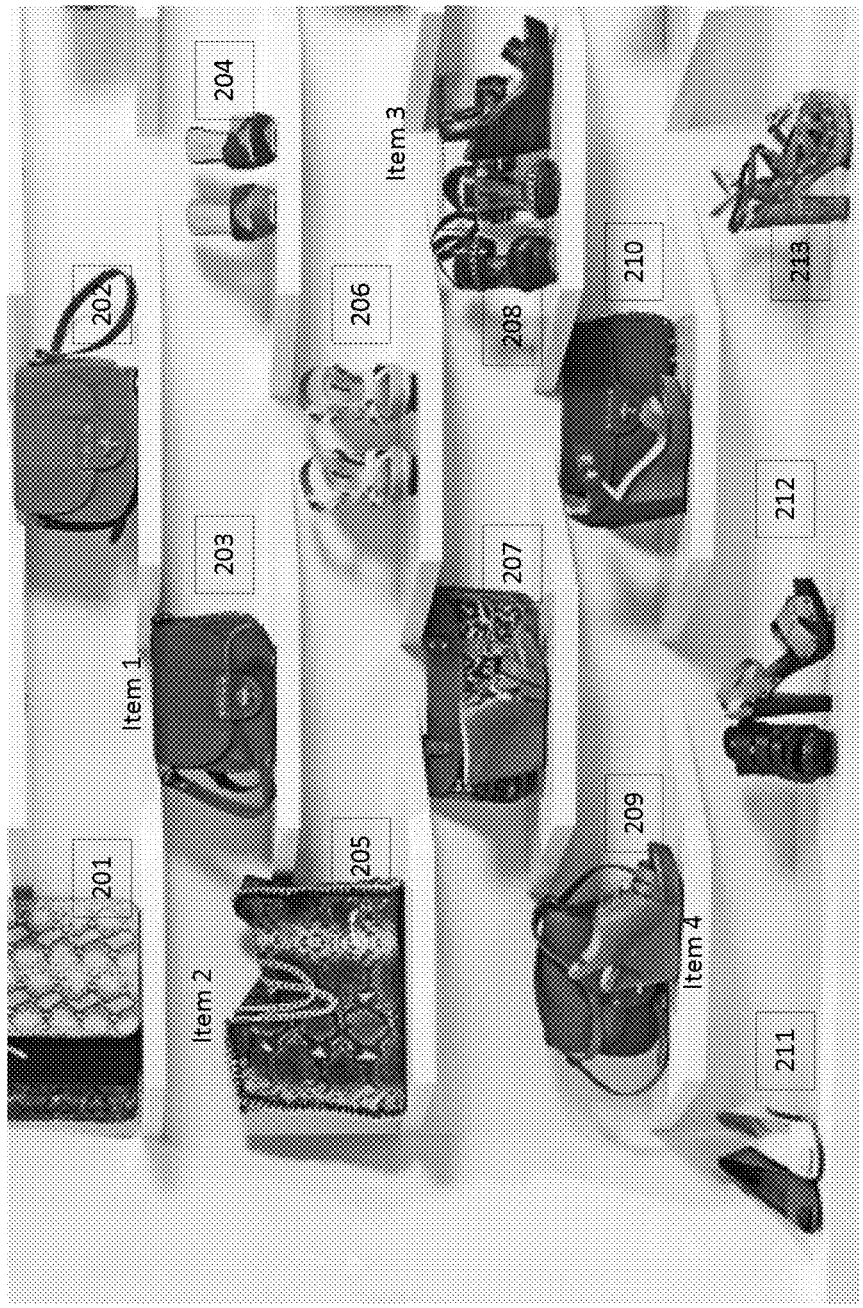
FIG. 2 illustrates an example embodiment of a display shelf at a merchant store that displays multiple items.

FIG. 2 illustrates merchant store display shelves 200 having beacon devices 201-213. In the example embodiment shown in FIG. 2, each of the beacon devices 201-213 is positioned near one or more items displayed on the merchant store display shelves 200. When a customer is within the range of one or more of the beacon devices 201-213, the customer's user device 111 and the pertinent beacon-enabled applications or apps installed on the user device 111, such as the extended inventory shopping application 113, may be automatically started. In various embodiments, beacon-enabled applications or apps may register with iOS/Android (or other user device operating systems) to be started when specific beacons move within the range of the user device 111.

In an example embodiment, the beacon device 700 may identify itself using one or more of three customizable values: proximity UUID 751 (128 bit), major UUID 752 (16 bit), and minor UUID 753 (16 bit), as shown in FIG. 7B. There is also an internal product dentifier 754 that may be used as well. The three customizable values allow for three levels to identify a micro-location: proximity UUID only, proximity UUID and major, and proximity UUID and major and minor. In an example embodiment, the proximity UUID may identify the merchant store 100, the major may identify an individual display shelf within the merchant store 100, and the minor may identify a display item for sale on one of the merchant store display shelves.

In various embodiments, the term "beacon ID" used herein refers to one or more of the proximity UUID 751, the major UUID 752 and/or the minor UUID 753, which may be used to provide a unique identifier of the beacon device 700. The proximity UUID 751 of the beacon device 700 is generally a unique 128-bit value and is generated by the owners of the beacon device 700. For example, the proximity UUID can be generated by loading the terminal on a Macintosh computer and entering "uuidgen" to generate a UUID such as 23542266-18D1-4FE4-B4A1-23F8195-B9D39.

In FIG. 2, each of the beacon devices 201-213 has one or more product identifiers associated with a unique beacon ID. Each of the beacon devices 201-213 may be associated with one or more displayed items (i.e., by associating or mapping beacon IDs with item identifiers), so that when customer 110 is standing in front of the merchant store display shelves 200 and within range of one or more of the beacon devices 201-213, the customer 110 may be alerted via the user device 111 that she is near displayed items and may view these displayed items on the user device 111.

For example, the customer 110 may be able to view the items near her on the user device 111, as shown in FIG. 4. If the customer 110 is within the vicinity of beacon devices 209, 205, 203 and 208, items 1-4 will be displayed on the user device 111 with the message "ITEMS NEAR YOU" in the upper portion 410 of the user device 111. FIG. 6 illustrates an aerial view of a merchant store 600 having beacon devices 601-614 positioned throughout the merchant store 600. Each of the beacon devices 601-614 is associated with one or more displayed items for sale within the merchant store 600. In some embodiments, a single displayed item may be associated with a single beacon device 700, and in alternative embodiments, many displayed items may be associated with a single beacon device 700.

Example Data Tables

FIG. 7B illustrates a beacon ID product identifier mapping table 750 according to an embodiment, which maps individual beacon devices (each of which is identified by a beacon ID comprised of a beacon proximity UUID 751, a beacon major UUID 752 and a beacon minor UUID 753) to individual displayed products (each of which is identified by a product identifier 754). In alternative embodiments, the beacon ID may not include the major UUID 752 and/or the minor UUID 753. In an example embodiment, the proximity UUID 751 may identify merchant store 100, the major UUID 752 may identify the individual merchant store display shelves 200 within the merchant store 100, and the minor UUID 753 may identify one or more display items (e.g., items 1-4) for sale on the merchant store display shelves 200. In the example shown in the table 750, the beacon proximity UUID 751 of 75123542266-18D1-4FE4-B4A1-23F8195B9D39 is the same for items 1-4 (which are located in the same merchant store 100), the beacon major UUID 752 of "1" is the same for items 1-4 (which are located on the same merchant store display shelves 200), and the beacon minor UUIDs 753 represent different values (1-4) because the beacon devices 203, 205, 208 and 209 are each associated with different displayed item(s), as shown by the product identifiers 754. In the example shown in FIG. 7B the product identifiers 754 include an item number and an extension, which represents a variation of the item. In other words, the product identifier 754 for item 1.12 refers to item 1, shown in FIG. 2, and the extension 12 refers to one of the product variations of item 12. The number of variations for each displayed item may vary, depending on the attributes of the item, such as size, color, etc. In further embodiments, other product identifier formats may be used.

FIG. 7C is an example of an extended inventory table 770 for a selected item shown in FIG. 2, such as item 4. Item 4 includes two attributes, color and shoe size. There are twenty possible variations of item 4 shown in FIG. 7C, as shown by product identifiers 771, in particular the extensions 01-20. An attribute 1 772 represents the color attribute, and an attribute 2 773 represents the shoe size attribute. The variations shown in the table 770 include the various combinations of attribute 1 772 and attribute 2 773. The table 770 also includes information about whether each variation of displayed item 4 is available in store inventory 774 and available online 775 In this example, the "x" designates the variation is available.

Example User Interface

FIGS. 4 and 5 illustrate examples of displayed items available for purchase within a merchant store 100 that are near to a customer 110 having a user device 111. The upper portion 410 of the user device 111 displays "ITEMS NEAR YOU", presenting items 1-4 in graphical elements 411-414. The lower portion 420 of user device 111 displays "OTHER ITEMS IN THE STORE OR ONLINE", presenting recommendations shown by images 421-425 of other items in the store (which are not in close enough proximity to the user device 111 to be discovered but may be of interest to the customer 110). Items 411-414 represent displayed items for sale within the merchant store 100 that are automatically discovered using location based information.

Item 4, having reference numeral 414, shown in FIG. 4, is the selected item in FIG. 5. A display element 510 displays the selected item 414. A display element 520 displays the available colors of the selected item 414, and a display element 530 displays available sizes of the selected item 414. The available colors and available sizes represent variations of the selected item 414 available in an extended inventory in an example embodiment. In alternative embodiments, the variations may include other attributes available in the extended inventory. The extended inventory may include items available in the store inventory and/or items available online from the merchant store 100. In an example embodiment, once the customer 110 selects specific variations of the displayed item 414, for example, fuchsia and size 7, the customer 110 may request, using the user device 111, to have the selected variation(s) brought by store sales person 120 out of the physical location where the extended inventory is stored. In an example embodiment, a request button 540 may be selected by the customer 110 to request that the items or variations be brought out from the extended inventory; however, in alternative embodiments, other selection mechanisms may be used to request that the items or variations be brought out from the extended inventory. A display element 550 displays recommended items 551-555, which represent items similar to or complementary to the selected item 414. The recommended items 551-555 may be identified by the extended inventory shopping application (113, 123, or 161) and/or other marketplace applications (114, 124, or 162).

Example Extended Inventory Shopping System

Figure 8:
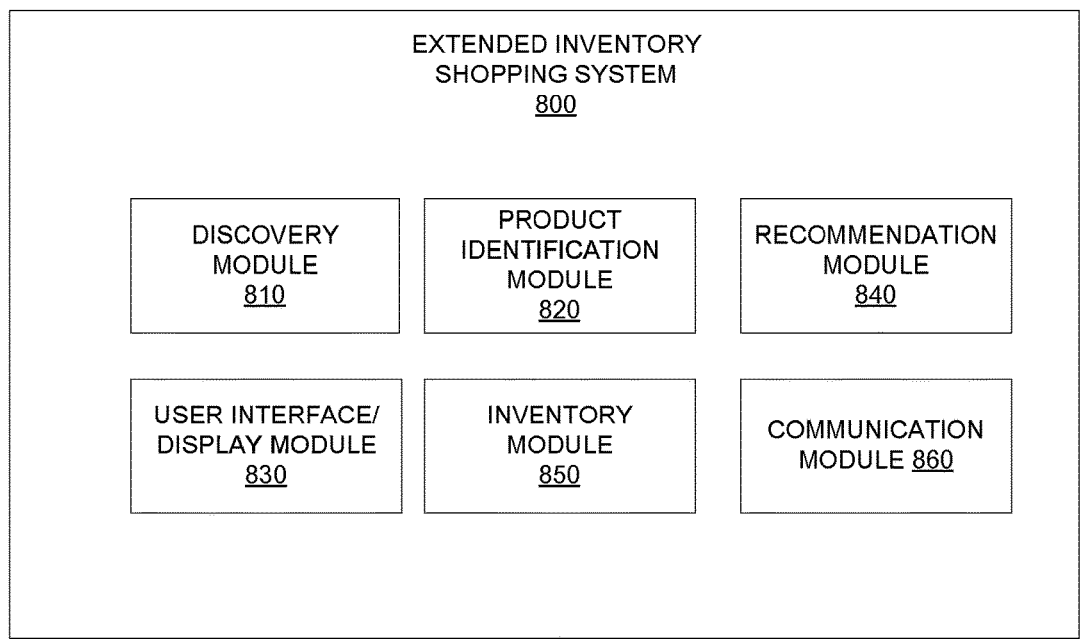
FIG. 8 is a block diagram illustrating an extended inventory shopping system according to an example embodiment.

FIG. 8 illustrates an example embodiment of an extended inventory shopping system 800. The extended inventory shopping system 800 includes a discovery module 810, a product identification module 820, a recommendation module 840, a user interface/display module 830, an inventory module 850, and a communication module 860. The interface/display module 830 may also be referred to as the display module 830, or alternatively, the user interface module 830. All of the modules may communicate with each other, for example, via a network coupling, shared memory, and the like. It will be appreciated that each module may be implemented as a single module, combined into other modules, or further subdivided into multiple modules. Other modules not pertinent to example embodiments may also be included, but are not shown. In an example embodiment, the extended inventory shopping system 800 may include extended inventory shopping application 161 residing on remote server 160 which is hosted by one or more server machines (not shown).

According to an example embodiment, the discovery module 810 is configured for automatic location based discovery of extended inventory. A customer 110, when in the communications range of one or more beacon devices 130, while shopping in a merchant store 100, may view on a user device 111 an extended inventory of displayed items for sale in the merchant store 100. While shopping, the customer 110 may browse items displayed on merchant store display shelves 200, as shown in FIG. 2. Once the user device 111 is within the communications range of one or more beacon devices 201-213, the geo-location of the user device 111 may be determined. In an example embodiment, each of the beacon devices 201-213 may send a broadcast BLE signal, for example at a rate of once per second, to any user device within range of its BLE signal. The beacon devices 201-213 are identified by customizable identifiers, which may be referred to as beacon UUIDs or beacon IDs. In an example embodiment, an inventory system 122 may comprise one or more inventory databases, each having a beacon ID product identifier mapping table (e.g., table 750) which stores a mapping of the beacon devices 130 to one or more displayed items for sale in the merchant store 100.

The displayed items in the merchant store 100 (associated with one or more of the beacon devices 130) are automatically discovered by the user device 111 when the user device 111 is within range of one or more of the beacon devices 130. Apps that are capable of running on beacon enabled devices may be referred to as beacon enabled apps. Beacon enabled apps on the user device 111 may be notified when the user device 111 moves in and out of the ranges of the beacon devices 130, and are able to monitor the distances between the user device 111 and each of the beacon devices 130 as they change over time. This allows beacon enabled apps installed on the user device 111 to know precisely where the user device 111 is located in terms of a map location using longitude and latitude, by calculating where user device 111 is located relative to known points (e.g., locations of the beacon devices 130). In an example embodiment, once a beacon-enabled app is installed on the user device 111, the user device 111 may automatically be discovered by one or more of the beacon devices 130 when it comes within range of one or more of the beacon devices 130.

In an example embodiment, the product identification module 820 is configured to track which of the beacon devices 130 are associated with which items displayed in the merchant store 100, as shown in the beacon ID product identifier mapping table. The product identification module 820 also tracks the variations, based on one or more item attributes, of the displayed items for sale. The variations of the displayed items are stored in an extended inventory table (e.g., table 770), which is also stored in one or more of the inventory database in the inventory system 122 in an example embodiment.

The user interface/display module 830 is configured to provide various user interface functionality capable of interactively presenting information to and receiving information from the customer 110. For example, the user interface/display module 830 may be configured to receive item information and recommendation information, and to request a merchant sales person 120 to retrieve extended inventory from the store inventory room. According to an example embodiment, the user interface/display module 830 displays "ITEMS NEAR YOU" in the upper portion 410 of a user device 111, along with appropriate items discovered by the user device 111 and the beacon devices 130, or displays "OTHER ITEMS IN THE STORE OR ONLINE" in the lower portion 420 of the user device 111. The items displayed in the lower portion 420 of the user device 111 having been recommended by the recommendations module 840. For example, the customer 110 may select item 4 (through the user interface/display module 830) to receive a listing or viewing of variations of item 4, based on item attributes. In the example where item 4 is selected, an example embodiment of the user device 111 may display the user device 111 screen shown in FIG. 5, with the message "ITEM 4 SELECTED" in a display element 510; the variations of item 4 based on a first product attribute, color, in a display element 520; and the variations of item 4 based on a second product attribute, size, in a display element 530. In a further embodiment, a request button 540 or other request mechanism may be available in the user interface/display module 830. In yet another embodiment, recommendations based on the item selected and/or user information (or account information) may be displayed with the message "YOU MIGHT ALSO LIKE" in a display element 550. The recommendations may be items similar to the selected item, or complementary items (e.g., accessories). For example, if the selected item is a pair of shoes, than a complementary item may be a purse, belt, pair of pants, or other item that may complement the selected pair of shoes.

Although FIGS. 4 and 5 use certain labels to identify various recommendations, displayed items, product attributes, request button, etc., the labels shown on the display of the user device 111 are used for illustrative purposes only, and other labels, or formatting or positioning of display elements shown in the display, may be used in alternative embodiments. Information may be presented using a variety of means, including visually displaying information and using other device outputs (e.g., audio, tactile, and so forth). Similarly, information may be received by the user device 111 by a variety of means, including alphanumeric input or other device input (e.g., one or more touch screens, cameras, tactile sensors, light sensors, infrared sensors, biometric sensors, microphones, gyroscopes, accelerometers, other sensors, and so forth). It will be appreciated that the user interface/display module 830 may provide many other user interfaces to facilitate the functionality described herein. "Presenting" may mean communicating information to a device (e.g., user devices 111 and 111), the device having functionality capable of performing a presentation using the communicated information. "Interactively presenting" may mean exchanging information between the presenting device (e.g., user devices 111 and 111) and the user interface/display module 830.

In various embodiments, the recommendation module 840 is configured to generate recommendations displayed on the user device 111. For example, the recommendations labeled "OTHER ITEMS IN THE STORE OR ONLINE" in the lower portion 420 of the user device 111, shown in FIG. 4, and the recommendations labeled "YOU MIGHT ALSO LIKE" in display element 550 of user device 111, shown in FIG. 5, may be generated by the recommendation module 840 based on one or more items selected by the customer 110. In further embodiments, the recommendations may be based on input from the customer 110 as well as account information, past purchase history and other personal information available from one or more applications that the customer 110 may be checked in to or logged in to while shopping. In an example embodiment, information available from Paypal may be used to personalize recommendations generated and presented to the customer 110 on the user device 111.

The inventory module 850 may be used to track the inventory of products sold at a merchant store 100 and/or at an online merchant store using inventory information. The inventory module 850 may be updated in real time using merchant devices such as POS devices and/or other devices for updating inventory information at the merchant store 100. The inventory information (including item information such as product identification and attributes and availability in-store and online) and beacon information (including beacon ID) may be generated by and/or stored in the inventory module 850. For example, a beacon ID product identifier mapping table 750, shown in FIG. 7B, and an extended inventory table 770, shown in FIG. 7C, may be stored in the inventory module 850. A request from a customer 110 to retrieve selected displayed items may be received by the inventory module 850 and accessed by a merchant sales person 120, who then retrieves those selected items from an inventory room, which stores the extended inventory of available variations of the selected item, so that the customer 110 can view and/or try on those selected items.

The communication module 860 may provide various communications functionality of the extended inventory shopping system 800. For example, network communication such as communicating between user device 111, the beacon device(s) 130, the merchant system 121, and the remote server 160, either thru network 150. In other examples, the user device 111 and the beacon devices may communicate via BLE communication protocols or other near range communication protocols. Information received by the communication module 860 may include data associated with a customer 110 (e.g., user profile information from an online account, social networking data associated with the customer 110, and so forth), data associated with an item (e.g., images of the item, reviews of the item, item recommendations and so forth), and other data. Further, the information received may be display information or item information displayed by user interface/display module 830. Additionally, input received through the user interface module/display module 830 may include selections made by the customer 110, and communicated through the communications module 860 over the network 150.

An example embodiment of a system 800 may include a communication module 860 to receive at a beacon id associated with a beacon device located at a store; a product identification module 820 to determine at least one product identifier representing a store displayed item available for sale by the store with one or more product identifiers associated with the beacon id; an inventory module 850 to identify, based on the at least one product identifier, product variations of the store displayed item available for sale by the store associated with each of the product identifiers; and a display module 830 to provide display information representing product variations of the store displayed item available for sale by the store associated with each of the product identifiers.

Example Extended Inventory Shopping System

FIGS. 9A, 9B, 10A and 10B illustrate example embodiments of communication paths 900, 950, 1000 and 1050, respectively, for automatically discovering and presenting displayed items in a store based on location and item information (for example, product identification and product attribute information), and further recommending other items (other in-store items not within range of a beacon device, and similar or complimentary items). The item information and recommendation information, which is displayed on the user device 111, may also be referred to as display information. As mentioned above, there is a mapping of one or more of the displayed items in the merchant store 100 to one of the beacon devices 130. Because of the association of one or more of the displayed items with one of the beacon devices 130, the displayed items in merchant store 100 can be automatically discovered by the user device 111 belonging to the customer 110. The one-to-one or many-to-one mapping between the beacon devices 130 and the displayed items for sale in the merchant store 100 may be stored in a beacon ID product identifier mapping table, such as table 750. The variations of the displayed items may be stored in an extended inventory table, such as table 770. In further embodiments, recommendations for displayed items may be stored in the table 750, the table 770 and/or a recommendation table (not shown). The beacon devices 130 and the user device 111 may have UUIDs. The beacon UUID may be referred to as the beacon ID (and may include major and/or minor UUIDs in addition to the proximity UUID). The user device 111 may have a mobile UUID, which may be a 128-bit number used to uniquely identify the user device 111 over the Internet.

Figure 9A:
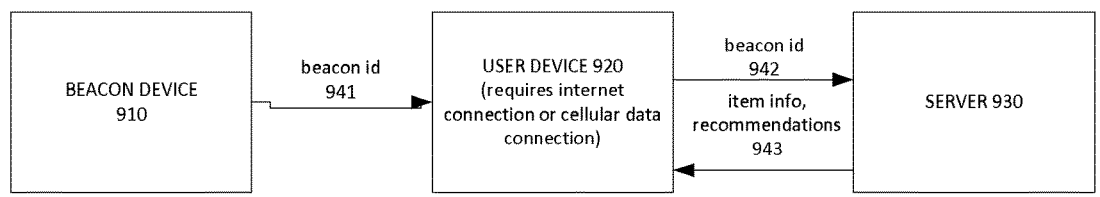
FIGS. 9A-9B and 10A-10B illustrate various embodiments of automatically discovering displayed items using location based information.

FIG. 9A illustrates an example embodiment for automatically discovering and presenting displayed items in a merchant store 100, based on location and item information, such that information about an extended inventory of the discovered displayed items is available to a customer 110 via a user device 920. In the embodiment shown in FIG. 9A, the user device 920 communicates with a server 930 via a network (such as a network 150). In an example embodiment, the network provides an Internet and/or cellular data network connection between the user device 920 and the server 930. A beacon device 910 provides a beacon ID over a path 941 using BLE communications protocol in an example embodiment. The beacon ID is passed from the user device 920 to the server 930 over a path 942. The server 930 may reside within a merchant system 121, for example in an inventory system 122, or alternatively within a remote server 160. The beacon ID is stored in a mapping table, such as a table 750, where each beacon device is mapped to one or more displayed items in the merchant store 100. The server 930 receives the beacon ID and generates item information and item recommendations, which are sent to the user device 920 over path 943. In an example embodiment, the item information may be generated by matching the beacon ID with product identification value(s) or information stored in a mapping table, such as a table 750. The item information includes information about the displayed items that were automatically discovered by the user device 920, and variations of those displayed items available for sale in the merchant store 100 and/or online. The server 930 also generates recommendations based on the item information and/or user account information and other personal information available to the server 930. The item information and recommendations provided to the user device 920 are displayed on user device 920. FIGS. 4 and 5 illustrate examples of item information and recommendations displayed on user device 920.

Figure 9B:
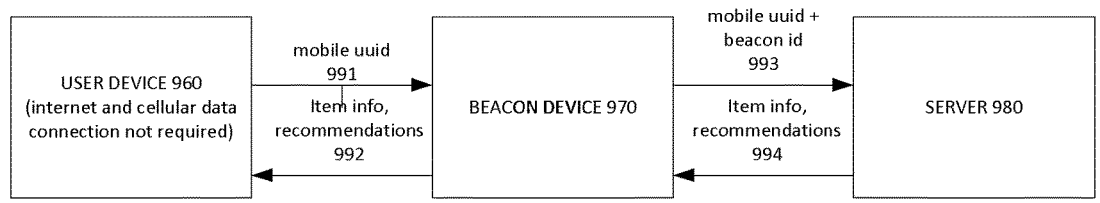

FIG. 9B illustrates another embodiment for automatically discovering and presenting displayed items in a store, based on location and item information, such that information about an extended inventory of the discovered displayed items is available to a customer 110 via a user device 960. In the embodiment shown in FIG. 9B, the user device 960 is not required to have Internet and/or cellular data connections to communicate with a beacon device 970, and with a server 980 via the beacon device 970. As shown in FIG. 9B, the user device 960 provides the beacon device 970 with its mobile UUID over a path 991 via BLE communications protocol. The user device 960 receives item information and recommendations over a path 992 from the beacon device 970 using BLE communications protocol. In an example embodiment, the beacon device 970 communicates with the server 980 via a network (such as a network 150). The beacon device 970 may provide its beacon UUID and the mobile UUID of the user device 960 to the server 980 over a path 993. It should be noted that sending the mobile UUID of the user device 960 to the server 980 is optional. The server 980 then provides the item information and recommendations to the beacon device 970 over a path 994. The server 980 generates the item information and recommendations as described above.

Figure 10A:
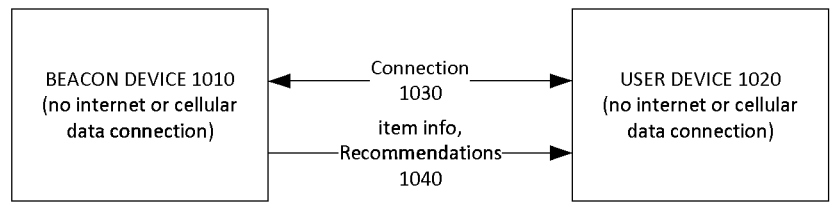

FIG. 10A illustrates another embodiment for automatically discovering and presenting displayed items in a store, based on location and item information, such that information about an extended inventory of the discovered displayed items is available to a customer 110 via a user device 1020. In the embodiment shown in FIG. 10A, the user device 1020 and a beacon device 1010 are not required to have Internet and/or cellular data connections to communicate with each other. Signals between the beacon device 1010 and the user device 1020 are communicated via BLE communication protocol over paths 1030 and 1040 in an example embodiment. Item information, which may be stored in mapping tables and extended inventory tables 750 and 770, respectively, is stored in the beacon device 1010. In an example embodiment, the beacon device 1010 includes recommendation information, which is pre-programmed and stored in the beacon device 1010. The item information and the recommendation information may be stored in one or more tables (not shown) in a memory component 708 of the beacon device 1010, as shown in FIG. 7A. A connection between the beacon device 1010 and the user device 1020 is established over the path 1030 using BLE communication protocol in an example embodiment. Once the connection is established between the beacon device 1010 and the user device 1020, the beacon device 1010 may provide the user device 1020 with the item information and recommendation information to be displayed on the user device 1020. The item information and recommendation information may be generated by accessing one or more tables stored in the beacon device 1010, which include beacon UUIDs associated with one or more product identifiers, and recommendation information associated with the product identifiers.

Figure 10B:
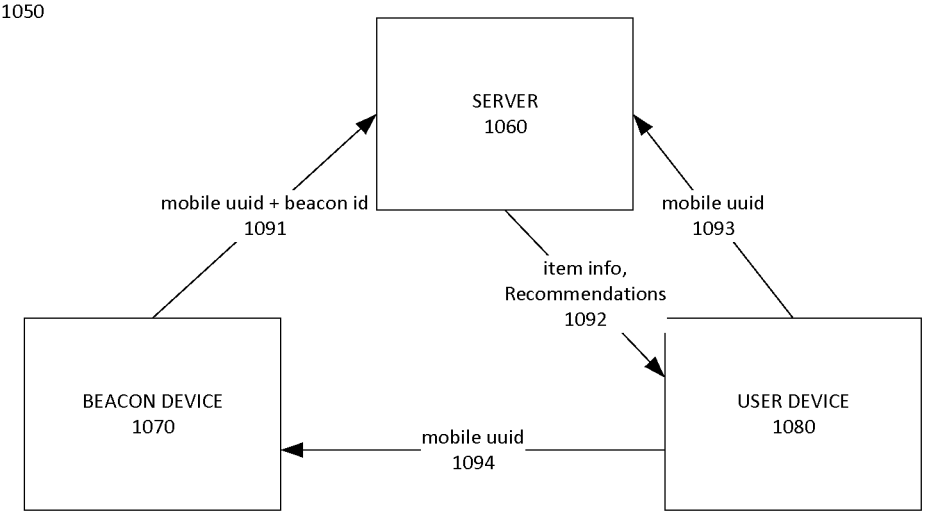

FIG. 10B illustrates another embodiment for automatically discovering and presenting displayed items in a store, based on location and item information, such that information about an extended inventory of the discovered displayed items is available to a customer 110 via a user device 1080. In the embodiment shown in FIG. 10B, the user device 1080 and a beacon device 1070 may use wireless and/or cellular data connections to communicate with a server 1060 over paths 1091, 1092 and 1093. In addition, the user device 1080 and the beacon device 1070 may communicate with each other over a path 1094 using BLE communication protocol. In the embodiment shown in FIG. 10B, the user device 1080 provides its mobile UUID over the path 1093 to the server 1060 and over the path 1094 to the beacon device 1070. In an example embodiment, the user device 1080 does not receive the beacon UUID, which may be hidden from the user device 1080 for security reasons. For example, users could collect tokens to scrape network details, or "counterfeit" the digital beacons. The mobile UUID and beacon UUID are sent from the beacon device 1070 to the server 1060 over the path 1091. The server 1060 matches the mobile UUID received from the beacon device 1070 over path 1091 with the mobile UUID received from the user device 1080 over the path 1093. Once a mobile UUID match is found, the server 1060 is able to identify the associated beacon UUID (received over path 1091). Once the beacon UUID is known, the server 1060 may generate item and recommendation information as described above, and transmit that information over the path 1092 to the user device 1080.

Figure 11A:
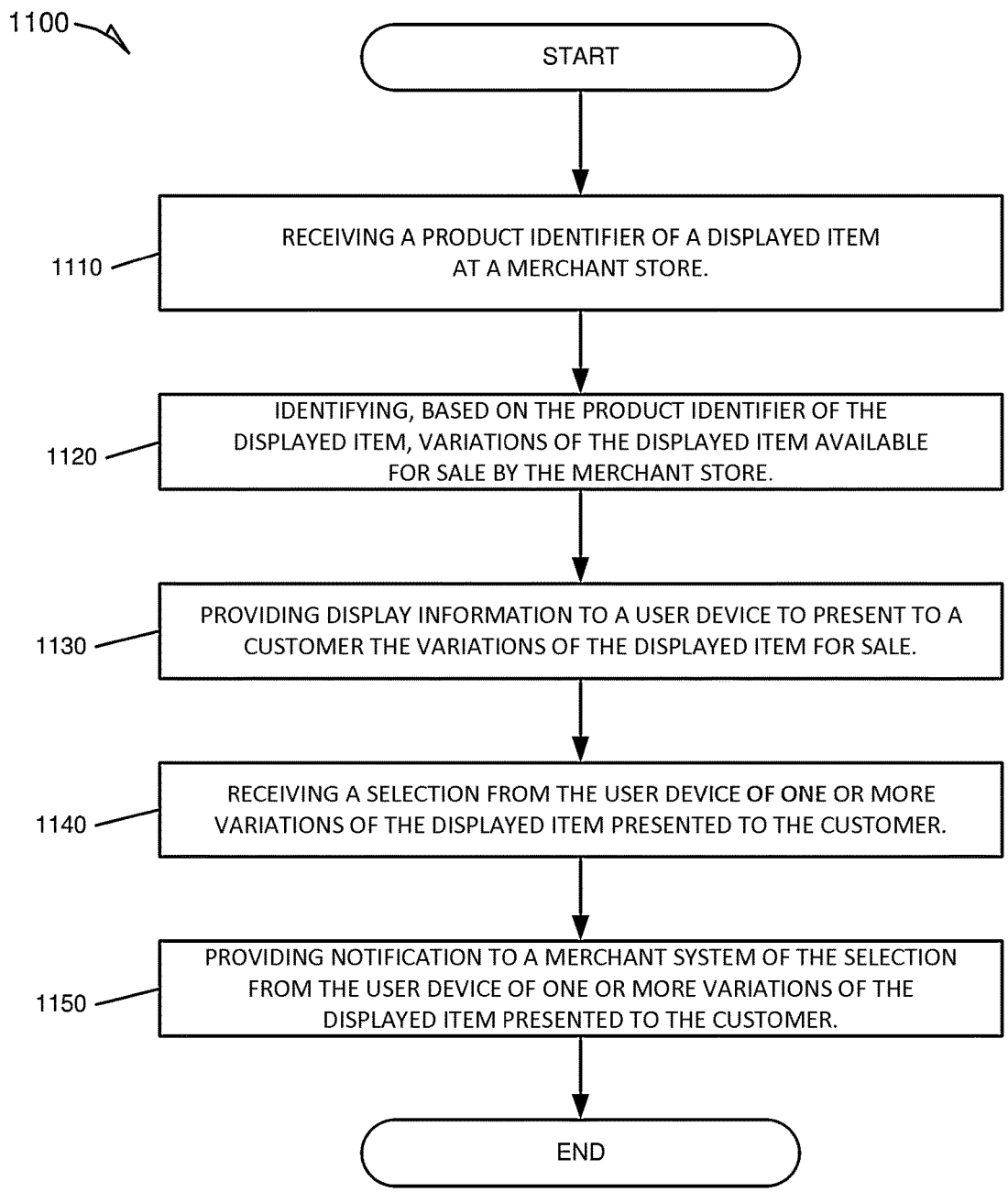
FIGS. 11A and 11B are flow diagrams illustrating example embodiments for automatically discovering extended inventory of a displayed item.

FIG. 11A is a flow diagram illustrating a method 1111 for automatically discovering extended inventory of a displayed item, according to one embodiment. In example embodiments, the method 1111 may be implemented using the various embodiments shown in FIGS. 9A, 9B, 10A and 10B. In an example embodiment, at operation 1101 receiving a beacon ID associated with a beacon device, the beacon device located at a store; at operation 1102, determining at least one product identifier representing one or more of store displayed items available for sale by the store, the at least one product identifier associated with the beacon ID; at operation 1103, identifying product variations of the one or more store displayed items available for sale by the store associated with the at least one product identifier; and at operation 1104 providing display information representing the product variations of the one or more store displayed items available for sale by the store.

In some embodiments, the beacon ID received may be associated with a beacon device located at a store in close proximity to store displayed items available for sale by the store. The proximity between the beacon device and the store displayed items should be close enough such that a customer viewing the store displayed items will have their user device discovered by the beacon device. For example, if the customer device is a beacon enabled user device, the user device may be discovered using BLE protocols when the user device is located near the store displayed items available for sale and the store displayed items have product identifiers associated with the beacon ID associated with the beacon device. The beacon ID may be provided by a beacon device or a user device.

In some embodiments, a mapping table is used to map product identifiers to beacon IDs. For example, a single product identifier may be mapped to one beacon ID may be retrieved from a mapping table, or alternatively, multiple product identifiers may be mapped to one beacon ID. In various embodiments, each of the product identifiers may represent one store displayed item.

In other embodiments, the inventory available in the store of the displayed items available for sale by the store may be determined. In yet other embodiments, the inventory available in the store of the displayed items available for sale by an online store associated with the store may be determined. Display information may be provided to a user device (e.g., user device 111) or other system (e.g., the merchant system 121), to display availability or inventory of product variations from the store and/or an online store associated with the store on the user device.

In further embodiments, a selection from a user device may be received. The selection may represent a selection of the product variations of the one or more store displayed items presented to a customer. A merchant system may be provided with notification of the customer's selection product variations.

In another embodiment, a selection from a user device may be received. The selection may represent a selection of the product variations of the one or more store displayed items presented to a customer. A merchant system may be provided with a request to retrieve store inventory of one or more displayed items. A customer may provide such a request, if the customer would like to view of try on the item or purchase the item.

In yet another embodiment, at least one beacon ID may be received. Each of the beacon IDs is associated with a beacon device located at a store in close proximity to one or more store displayed items available for sale by the store. At least one product identifier, corresponding to at least one of the beacon IDs, is determined. Display information may be provided based on the product identifiers which were determined. The display information representing one or more store displayed items available for sale by the store near a user device used to present the display information.

Figure 11B:
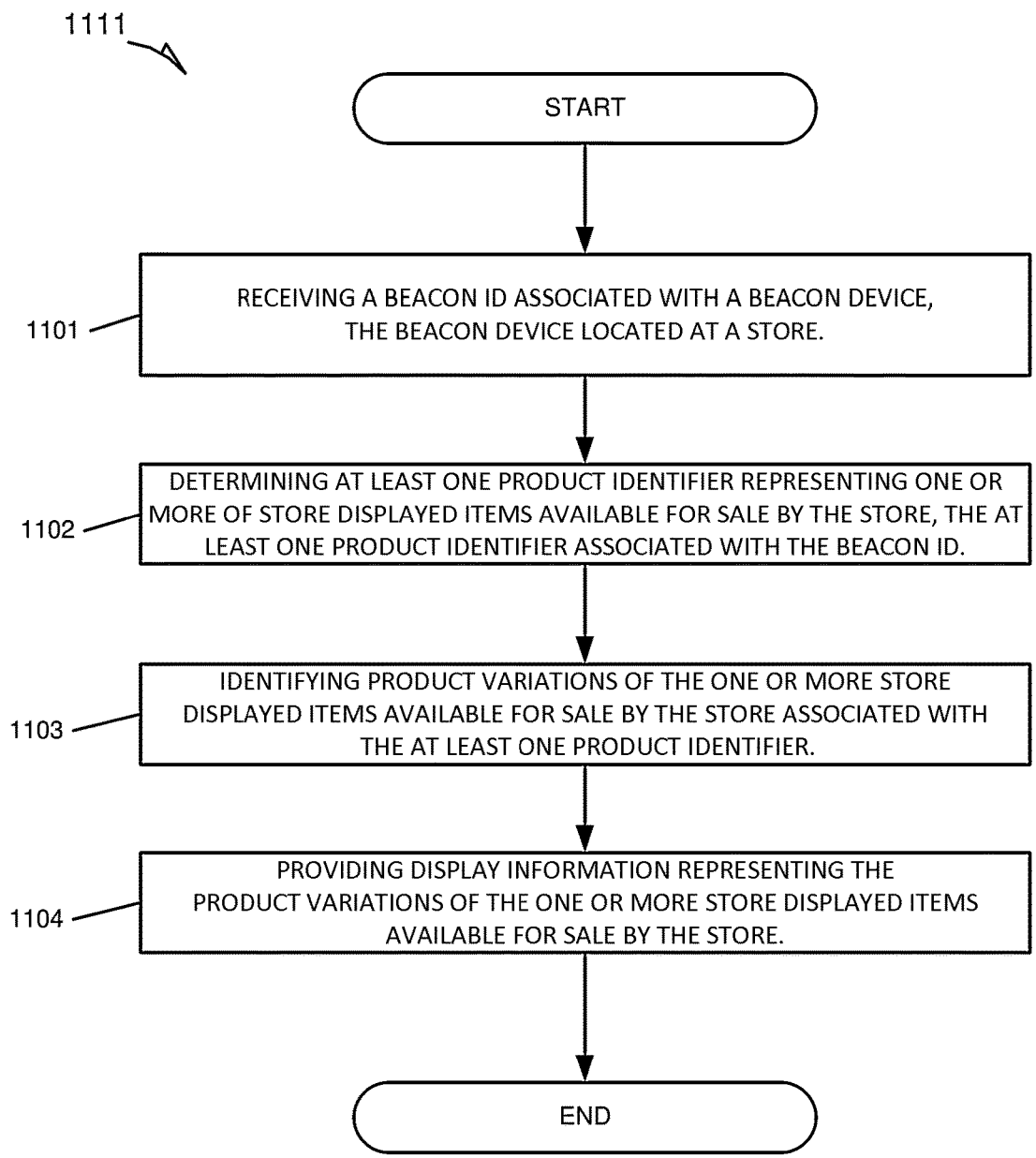

FIG. 11B is a flow diagram illustrating a method 1100 for automatically discovering extended inventory of a displayed item, according to an example embodiment. In an example embodiment, the method 1100 includes, at operation 1110, receiving a product identifier of a displayed item at a merchant store; at operation 1120, identifying, based on the product identifier of the displayed item, variations of the displayed item available for sale by the merchant store; at operation 1130, providing display information to a user device to present to a customer the variations of the displayed item for sale by the merchant store; at operation 1140, receiving a selection from the user device of one or more variations of the displayed item presented to the customer; and at operation 1150, providing notification to a merchant system of the selection from the user device of one or more variations of the displayed item presented to the customer. In some embodiments, operations 1140 and 1150 are optional and may not be performed. In further embodiments, the variations include size, color and other attributes of the displayed items for sale at the merchant store. In other embodiments, the variations of the displayed items for sale include extended inventory in the merchant store and available online from the merchant store. In yet other embodiments, the merchant receives a request from the customer to retrieve one or more items from the store inventory.

Figure 12:
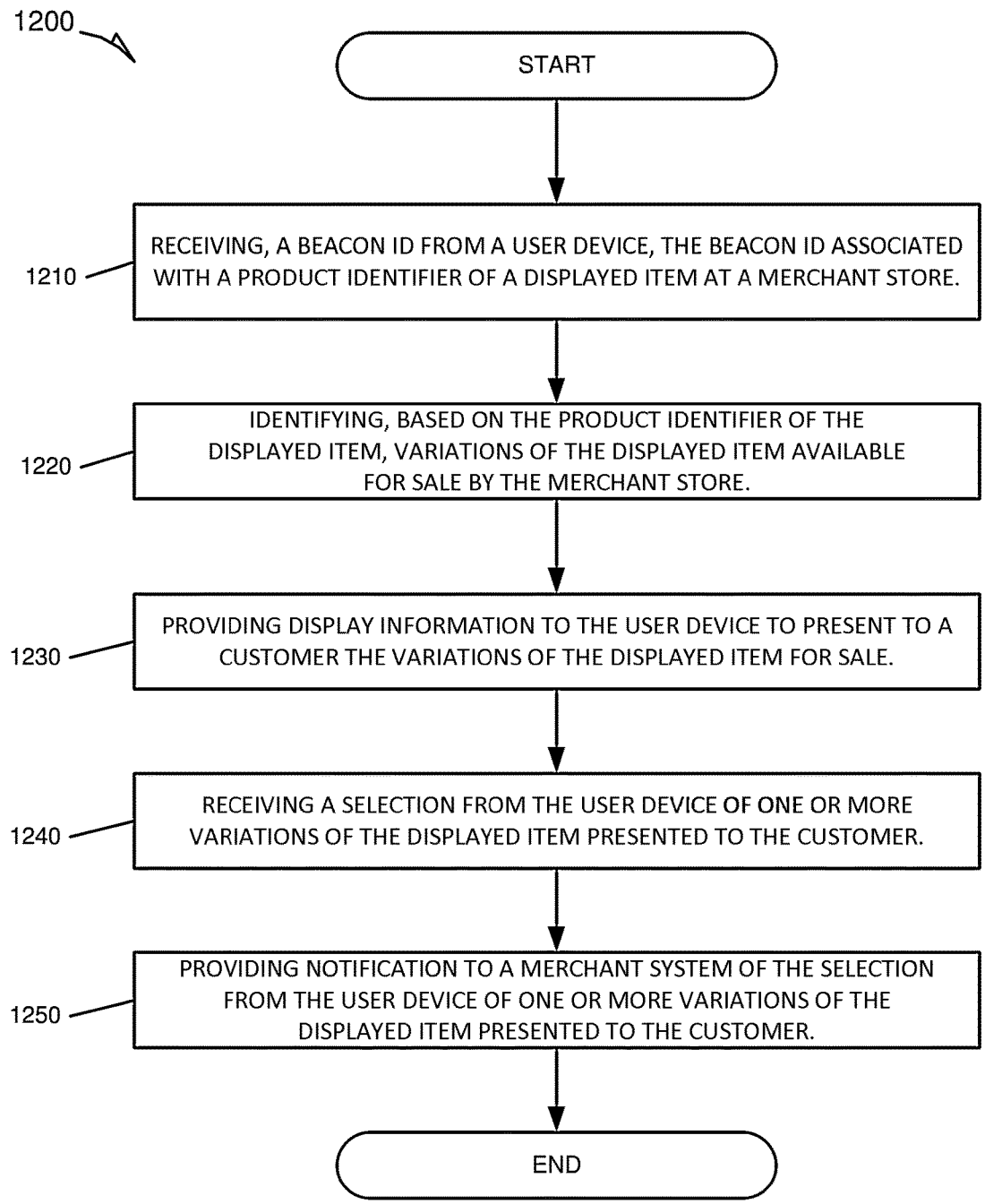
FIG. 12 is a flow diagram illustrating an example embodiment for automatically discovering extended inventory of a displayed item when a user device has a network connection.

FIG. 12 is a flow diagram illustrating a method 1200 for automatically discovering extended inventory of a displayed item when a user device has a network connection, according to example embodiments. The method 1200 may be implemented using the embodiment shown in FIG. 9A. In an example embodiment, the method 1200 includes, at operation 1210, receiving a beacon ID at a merchant store from a user device, the beacon ID being associated with a product identifier of a displayed item; at operation 1220, identifying, based on the product identifier of the displayed item, variations of the displayed item available for sale by the merchant store; at operation 1230, providing display information to the user device to present to a customer the variations of the displayed item for sale by the merchant store; at operation 1240, receiving a selection from the user device of one or more variations of the displayed item presented to the customer; and at operation 1250, providing notification to a merchant system of the selection from the user device of one or more variations of the displayed item presented to the customer.

Figure 13:
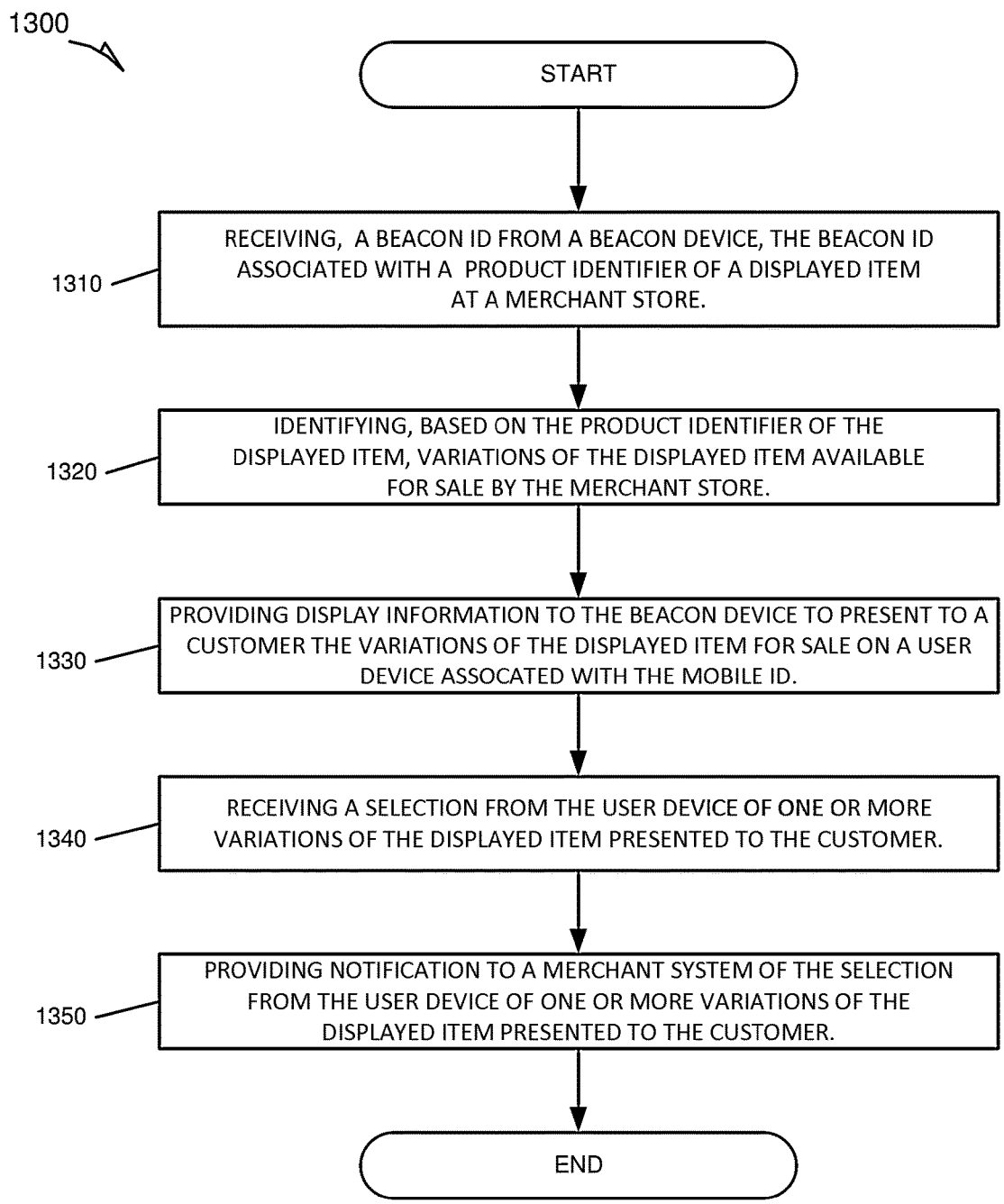
FIG. 13 is a flow diagram illustrating an example embodiment for automatically discovering extended inventory of a displayed item when a user device does not have a network connection.

FIG. 13 is a flow diagram illustrating a method 1111 for automatically discovering extended inventory of a displayed item when a user device does not have a network connection, according to example embodiments. The method 1111 may be implemented using the embodiment shown in FIG. 9B. In an example embodiment, the method 1111 includes, at operation 1310, receiving a product identifier of a displayed item at a merchant store from a beacon device, the product identifier being associated with a mobile ID; at operation 1320, identifying, based on the product identifier of the displayed item, variations of the displayed item available for sale by the merchant store; at operation 1330, providing display information to the beacon device to present to a customer the variations of the displayed item for sale at the merchant store on a user device associated with the mobile ID; at operation 1340, receiving a selection from the user device of one or more variations of the displayed item presented to the customer; and at operation 1350, providing notification to a merchant system of the selection from the user device of one or more variations of the displayed item presented to the customer.

Figure 14:
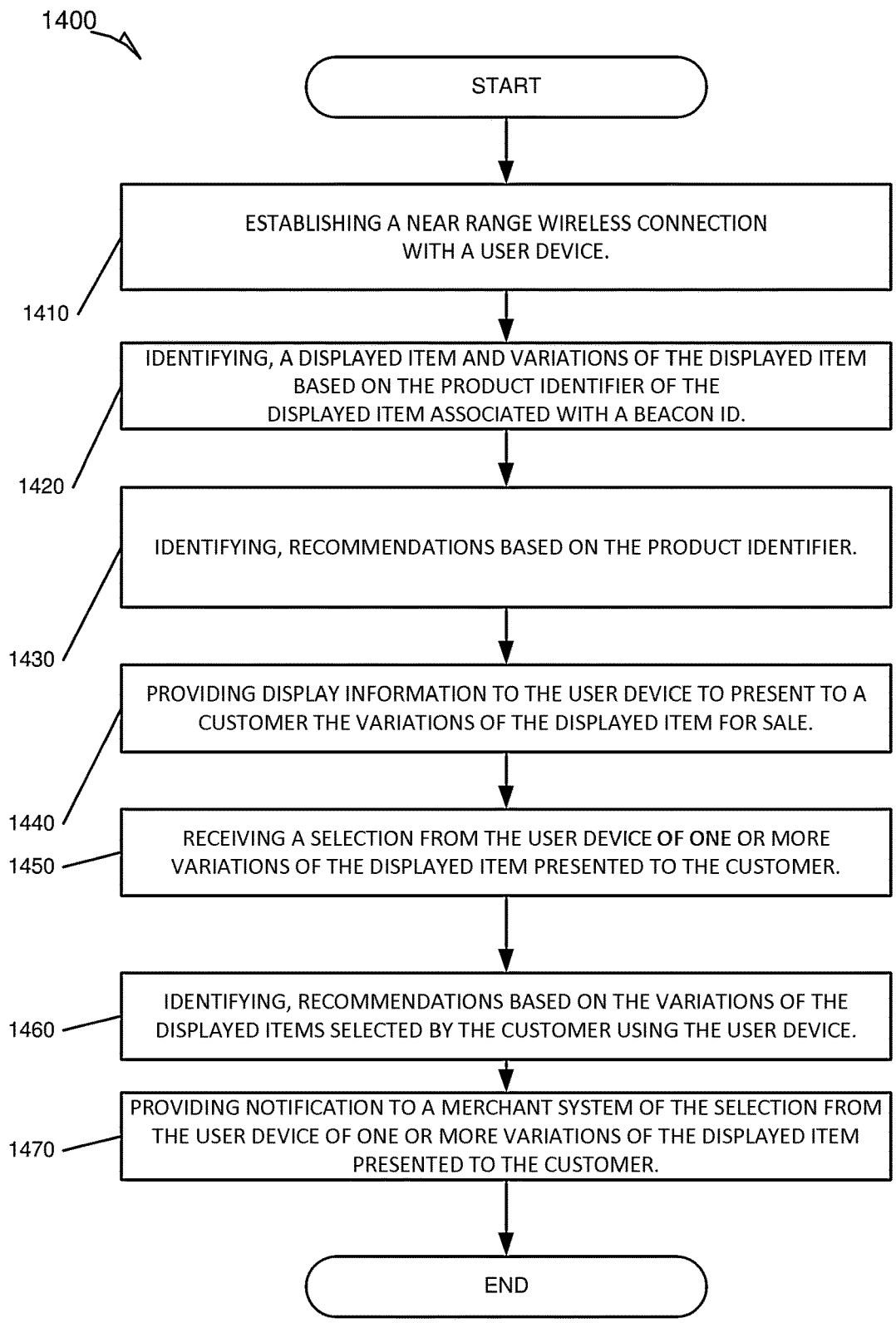
FIG. 14 is a flow diagram illustrating an example embodiment for automatically discovering extended inventory of a displayed item using near range wireless connection.

FIG. 14 is a flow diagram illustrating a method 1400 for automatically discovering extended inventory of a displayed item when a beacon device does not have a network connection, according to example embodiments. The method 1400 may be implemented using the embodiment shown in FIG. 10A. In an example embodiment, the method 1400 includes, at operation 1410, establishing a near range wireless connection with a user device; at operation 1420, identifying a displayed item and variations of the displayed item based on a product identifier of the displayed item associated with a beacon ID; at operation 1430, identifying recommendations based on the product identifier; at operation 1440, providing display information to the user device to present to a customer the variations of the displayed item for sale; at operation 1450, receiving a selection from the user device of one or more variations of the displayed item presented to the customer; at operation 1460, identifying recommendations based on the variations of the displayed items selected by the customer using the user device; and at operation 1470, providing notification to a merchant system (via BLE communications protocol) of the selection from the user device of one or more variations of the displayed item presented to the customer.

Figure 15:
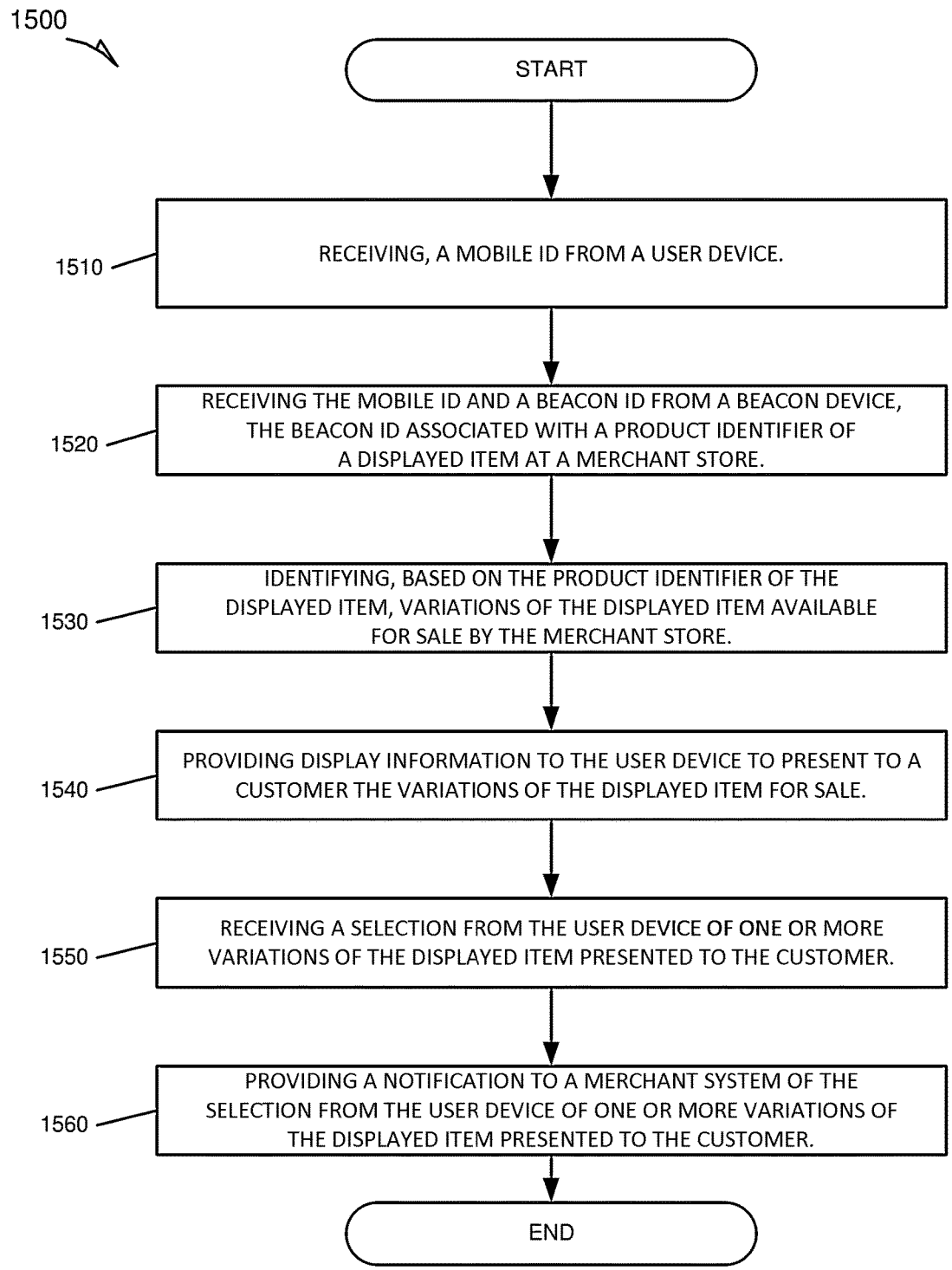
FIG. 15 is a flow diagram illustrating an example embodiment for automatically discovering extended inventory of a displayed item when the beacon ID is hidden from the user device.

FIG. 15 is a flow diagram illustrating a method 1500 for automatically discovering extended inventory of a displayed item when a beacon ID is hidden from a user device, according to example embodiments. The method 1500 may be implemented using the embodiment shown in FIG. 10B. In an example embodiment, the method 1500 includes, at operation 1510, receiving a mobile ID from a user device; at operation 1520, receiving the mobile ID and a beacon ID from a beacon device, the beacon ID being associated with a product identifier of a displayed item at a merchant store; at operation 1530, identifying, based on the product identifier of the displayed item, variations of the displayed item available for sale by the merchant store; at operation 1540, providing display information to the user device to present to a customer the variations of the displayed item for sale at the merchant store; at operation 1550, receiving a selection from the user device of one or more variations of the displayed item presented to the customer; and at operation 1560, providing a notification to a merchant system of the selection from the user device of one or more variations of the displayed item presented to the customer. For an example embodiment, the mobile ID received in operation 1510 and the mobile ID received in operation 1520 is matched to identify the beacon ID which is associated with the product identifier.

In an example embodiment, the flow diagrams 1111, 1100, 1200, 1300, 1400, and 1500 (shown in FIGS. 11A, 11B, 12, 13, 14, and 15 may be implemented using one or more modules of the extended shopping system 800 (shown in FIG. 8). The flow diagrams of methods 1111, 1100, 1200, 1300, 1400, and 1500 include several operations in the embodiments shown in FIGS. 11A, 11B and 12-15, respectively. For alternative embodiments, one or more of the operations shown in the flow diagrams 1111, 1100, 1200, 1300, 1400, and 1500 may not be performed, and in yet further embodiments, additional operations (not shown in flow diagrams 1111, 1100, 1200, 1300, 1400, and 1500) may be performed. In yet other embodiments, one or more of the operations from the flow diagrams 1111, 1100, 1200, 1300, 1400, and 1500 may be combined into a single operation or subdivided into multiple operations. In other example embodiments, flow diagrams 1111, 1100, 1200, 1300, 1400, or 1500 may be combined to include one or more operations in the other flow diagrams.

Figure 16:
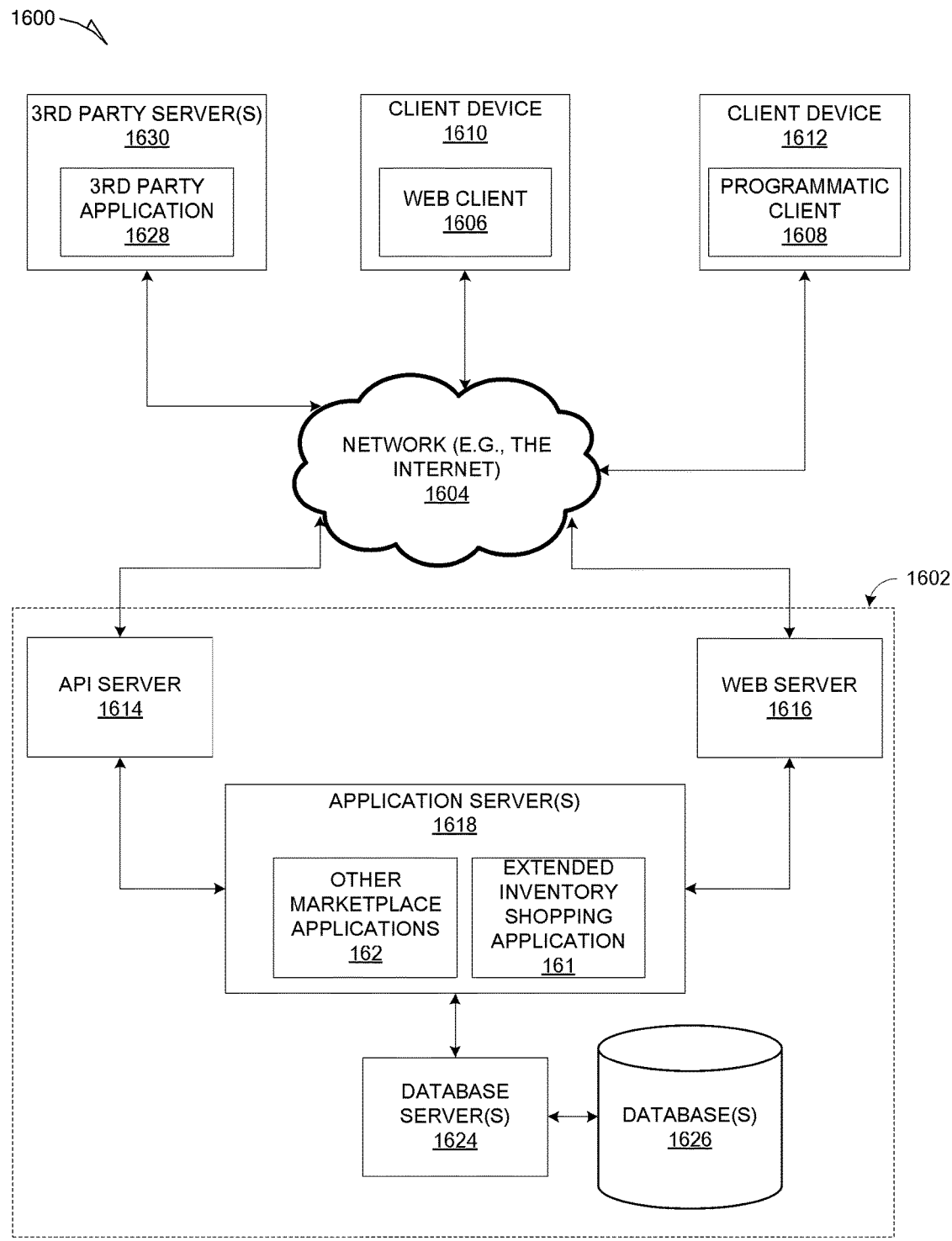
FIG. 16 is a block diagram of a networked system depicting an example embodiment.

In FIG. 16, an example embodiment of a high-level client-server-based network architecture 1600 is shown. A networked system 1602, provides server-side functionality via a network 1604 (e.g., the Internet or wide area network (WAN)) to one or more client devices 1610 and 1612. The network 1604 may represent network 150, shown in FIG. 1. FIG. 16 illustrates, for example, a web client 1606 (e.g., a browser, such as the Internet Explorer® browser developed by Microsoft® Corporation of Redmond, Wash.), and a programmatic client 1608 executing on the respective client devices 1610 and 1612.

The client devices 1610 and 1612 may comprise a mobile phone, desktop computer, laptop, or any other communication device that a user may utilize to access the networked system 1602. The client devices 1610 and 1612 may be devices of a user that are used for automatic location based discovery of extended inventory within the networked system 1602. In one embodiment, the networked system 1602 is a network-based marketplace that allows a user in a merchant store to access extended inventory while shopping and browsing displayed items for sale. One or more users (not shown) may be a person, a machine, or another means of interacting with client devices 1610 and 1612. In various embodiments, the user device 111 and/or the merchant system 121 (including other merchant devices) may represent client devices 1610 and 1612.

An application program interface (API) server 1614 and a web server 1616 are coupled to, and provide programmatic and web interfaces respectively to, one or more application servers 1618. The one or more application servers 1618 may represent remote server 160 shown in FIG. 1 and may host one or more other marketplace applications 162 and the extended inventory shopping application 161, each of which may comprise one or more modules or applications, and each of which may be embodied as hardware, software, firmware, or any combination thereof. The one or more application servers 1618 are, in turn, shown to be coupled to one or more database servers 1624 that facilitate access to one or more information storage repositories or database(s) 1626. In an example embodiment, the one or more databases 1626 are storage devices that store information (e.g., publications or listings) to be posted to the other marketplace applications 162. The one or more databases 1626 may store inventory information, display information, item information and recommendation information in accordance with example embodiments.

The marketplace system(s) 1620 may provide a number of marketplace functions and services to users that access the networked system 1602. The extended inventory shopping application 161 may likewise provide a number of functions used for automatic location based discovery of extended inventory. While the other marketplace applications 162 and the extended inventory shopping application 161 are shown in FIG. 16 to both form part of the networked system 1602, it will be appreciated that, in alternative embodiments, each application 161 and 162 may form part of a service that is separate and distinct from the networked system 1602. In some embodiments, the extended inventory shopping application 162 may form part of the other marketplace applications 162.

Further, while the client-server-based network architecture 1600 shown in FIG. 16 employs a client-server architecture, the present inventive subject matter is of course not limited to such an architecture, and could equally well find application in a distributed, or peer-to-peer, architecture system, for example. The other marketplace and extended inventory shopping applications 162 and 161 could also be implemented as stand-alone software programs, which do not necessarily have networking capabilities.

The web client 1606 accesses the other marketplace and extended inventory shopping applications 162 and 161 via the web interface supported by the web server 1616. Similarly, the programmatic client 1608 accesses the various services and functions provided by the other marketplace and extended inventory shopping applications 162 and 161 via the programmatic interface provided by the API server 1614. The programmatic client 1608 may, for example, be a seller application (e.g., the Turbo Lister application developed by eBay® Inc., of San Jose, Calif.) to enable sellers to author and manage listings on the networked system 1602 in an off-line manner, and to perform batch-mode communications between the programmatic client 1608 and the networked system 1602.

Additionally, one or more third party application(s) 1628, executing on one or more third party server(s) 1630, are shown as having programmatic access to the networked system 1602 via the programmatic interface provided by the API server 1614. For example, the third party application(s) 1628, utilizing information retrieved from the networked system 1602, may support one or more features or functions on a website hosted by a third party. The third party website may, for example, provide one or more promotional, marketplace, or payment functions that are supported by the relevant applications of the networked system 1602.

Modules, Components, and Logic

Figure 17:
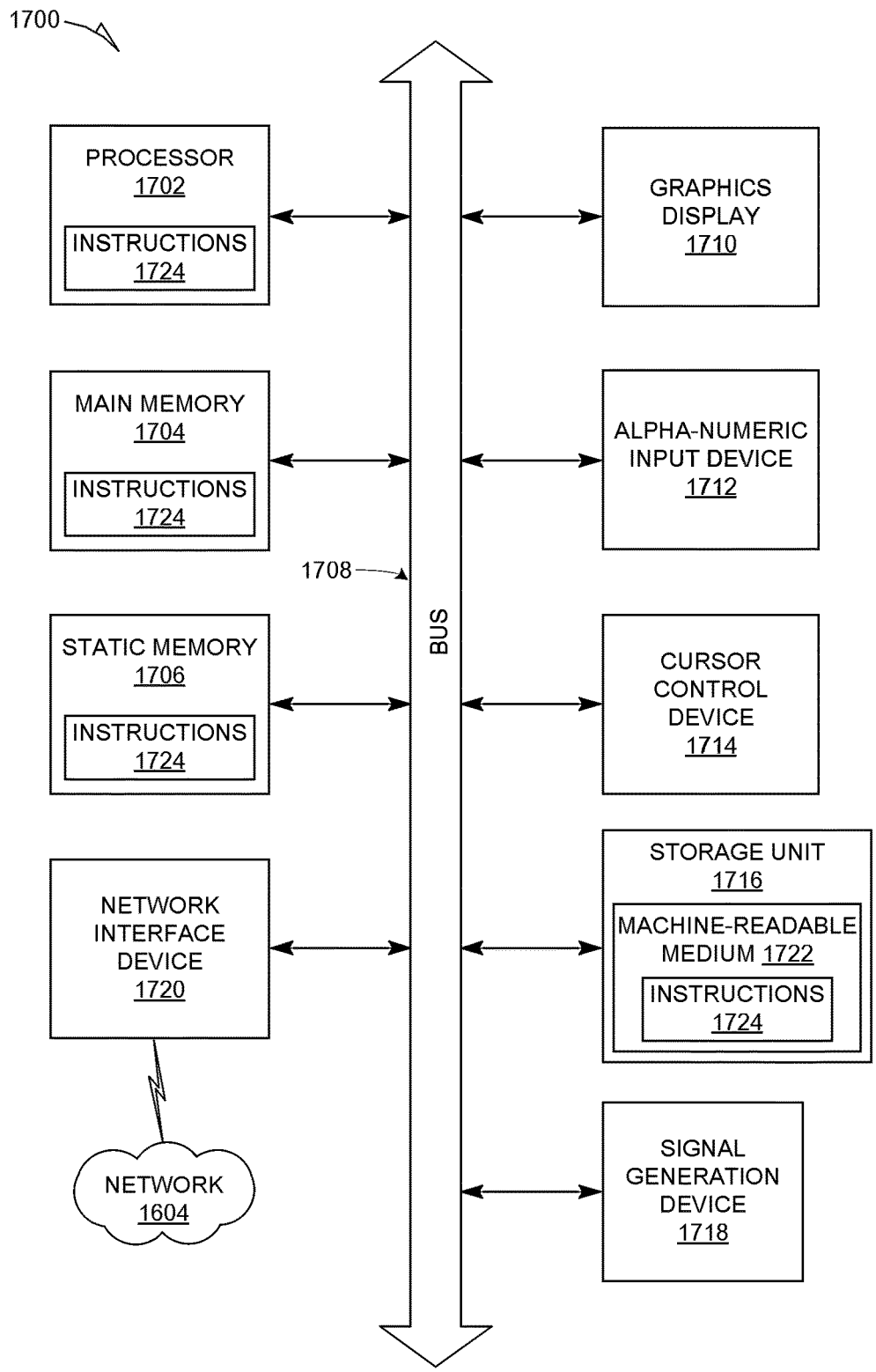
FIG. 17 is an example embodiment of a computer system in conjunction with the present inventive subject matter.

FIG. 17 is a operation diagram illustrating components of a machine 1700, according to some example embodiments, able to read instructions from a machine-readable medium (e.g., a machine-readable storage medium) and perform any one or more of the methodologies discussed herein. Specifically, FIG. 17 shows a diagrammatic representation of the machine 1700 in the example form of a computer system within which instructions 1724 (e.g., software, a program, an application, an applet, an app, or other executable code) for causing the machine 1700 to perform any one or more of the methodologies discussed herein may be executed. In alternative embodiments, the machine 1700 operates as a stand-alone device or may be connected (e.g., networked) to other machines. In a networked deployment, the machine 1700 may operate in the capacity of a server machine or a client machine in a server-client network environment, or as a peer machine in a peer-to-peer (or distributed) network environment. The machine 1700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any other machine capable of executing the instructions 1724, sequentially or otherwise, that specify actions to be taken by that machine. Further, while only a single machine 1700 is illustrated, the term "machine" shall also be taken to include a collection of machines 1700 that individually or jointly execute the instructions 1724 to perform any one or more of the methodologies discussed herein.

The machine 1700 includes a processor 1702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1704, and a static memory 1706, which are configured to communicate with each other via a bus 1708. The machine 1700 may further include a graphics display 1710 (e.g., a plasma display panel (PDP), a light emitting diode (LED) display, a liquid crystal display (LCD), a projector, or a cathode ray tube (CRT)). The machine 1700 may also include an alphanumeric input device 1712 (e.g., a keyboard), a cursor control device 1714 (e.g., a mouse, a touchpad, a trackball, a joystick, a motion sensor, or other pointing instrument), a storage unit 1716, a signal generation device 1718 (e.g., a speaker), and a network interface device 1720.

The storage unit 1716 includes a machine-readable medium 1722 on which are stored the instructions 1724 embodying any one or more of the methodologies or functions described herein. The instructions 1724 may also reside, completely or at least partially, within the main memory 1704, within the static memory 1706, within the processor 1702 (e.g., within the processor's cache memory), or any combination of these, during execution thereof by the machine 1700. Accordingly, the main memory 1704, the static memory 1706 and the processor 1702 may be considered as machine-readable media 1722. The instructions 1724 may be transmitted or received over a network 1604 via the network interface device 1720.

As used herein, the term "memory" refers to a machine-readable medium 1722 able to store data temporarily or permanently, and may be taken to include, but not be limited to, random-access memory (RAM), read-only memory (ROM), buffer memory, flash memory, and cache memory. While the machine-readable medium 1722 is shown in an example embodiment to be a single medium, the term "machine-readable medium" should be taken to include a single medium or multiple media (e.g., a centralized or distributed database, or associated caches and servers) able to store the instructions 1724. The term "machine-readable medium" shall also be taken to include any medium, or combination of multiple media, that is capable of storing instructions (e.g., the instructions 1724) for execution by a machine (e.g., the machine 1700), such that the instructions 1724, when executed by one or more processors of the machine 1700 (e.g., processor 1702), cause the machine 1700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium 1722 is non-transitory in that it does not embody a propagating signal. However, labeling the machine-readable medium 1722 as "non-transitory" should not be construed to mean that the medium is incapable of movement—the medium should be considered as being transportable from one physical location to another. Additionally, since the machine-readable medium 1722 is tangible, the medium may be considered to be a machine-readable device.

The instructions 1724 may further be transmitted or received over the communications network 1604 using a transmission medium via the network interface device 1720 and utilizing any one of a number of well-known transfer protocols (e.g., hypertext transfer protocol (HTTP)). Examples of communication networks include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying the instructions 1724 for execution by the machine 1700, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on the machine-readable medium 1722 or in a transmission signal) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. In embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor 1702, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1702 that are temporarily configured (e.g., by software) or permanently configured to perform the relevant operations. Whether temporarily or permanently configured, such processors 1702 may constitute processor-implemented modules that operate to perform one or more operations or functions described herein. As used herein, "processor-implemented module" refers to a hardware module implemented using one or more processors 1702.

Similarly, the methods described herein may be at least partially processor-implemented, a processor 1702 being an example of hardware. For example, at least some of the operations of a method may be performed by one or more processors 1702 or processor-implemented modules. Moreover, the one or more processors 1702 may also operate to support performance of the relevant operations in a "cloud computing" environment or as a "software as a service" (SaaS). For example, at least some of the operations may be performed by a group of computers (as examples of machines 1700 including processors 1702), with these operations being accessible via a network 1604 (e.g., the Internet) and via one or more appropriate interfaces (e.g., an application program interface (API)).

The performance of certain of the operations may be distributed among the one or more processors 1702, not only residing within a single machine 1700, but deployed across a number of machines 1700. In some example embodiments, the one or more processors 1702 or processor-implemented modules may be located in a single geographic location (e.g., within a home environment, an office environment, or a server farm). In other example embodiments, the one or more processors 1702 or processor-implemented modules may be distributed across a number of geographic locations.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
 a beacon device, the beacon device comprising a transceiver configured to broadcast a message on a wireless network including a beacon identifier (ID) associated with the beacon device, the message broadcast independent of any signal received by the beacon device;
 one or more server devices, the one or more server devices comprising:

one or more hardware processors;
a memory device storing instructions that configure the one or more hardware processors to perform operations comprising:
responsive to a user device coming into a communication range with the beacon device, receiving, from the beacon device, the beacon ID associated with the beacon device, the beacon device located at a store positioned near one or more store displayed items available for sale, each of the store displayed items having a product identifier associated with the beacon device;
receiving, from the beacon device, an identifier of the user device;
identifying product variations of the one or more store displayed items available for sale based on one or more of the product identifiers associated with the beacon device; and
providing display information representing the product variations of the one or more store displayed items available for sale to the user device, via the beacon device, based on the received identifier of the user device.

2. The system of claim 1, wherein the instructions further configure the one or more hardware processors to perform operations further comprising:
retrieving a product identifier from a mapping table based on the beacon ID, and identifying the product variations based on the product identifier.

3. The system of claim 1, wherein the instructions, further configure the one or more hardware processors to perform operations further comprising providing the display information to the user device to present inventory available for the product variations of the store displayed item available for sale store associated with each of the product identifiers.

4. The system of claim 3, wherein the instructions, further configure the one or more hardware processors to perform operations further comprising determining items similar to the store displayed item available for sale associated with each of the product identifiers.

5. The system of claim 1, further comprising:
a second beacon device, the second beacon device configured to broadcast a second beacon ID associated with the second beacon device, and wherein the instructions further configure the one or more hardware processors to perform operations comprising:
receiving, from the second beacon device, the second beacon ID associated with the second beacon device and the identifier of the user device, the second beacon device located at the store and positioned near one or more second store displayed items available for sale, each of the second store displayed items having a product identifier associated with the second beacon device;
identifying second product variations of the one or more second store displayed items available for sale based on one or more of the product identifiers associated with the second beacon device; and
providing display information representing the second product variations of the one or more store displayed items available for sale to the user device based on the received second beacon identifier and the identifier of the user device.

6. A method comprising:
broadcasting, by a beacon device, a message on a wireless network, the message including a beacon identifier (ID) associated with the beacon device, the message broadcast independent of any signal received by the beacon device;
responsive to a user device coming into a communication range with a beacon device* receiving, by one or more server devices, the beacon ID associated with the beacon device from the beacon device, the beacon device located at a store positioned near one or more store displayed items available for sale, each of the store displayed items having a product identifier;
receiving, by the one of more server devices, an identifier of the user device from the beacon device;
identifying, by the one of more server devices, product variations of the one or more store displayed items available for sale based on one or more of the product identifiers associated with the beacon device; and
providing, by the one of more server devices, display information representing the product variations of the one or more store displayed items available for sale to the user device, via the beacon device, based on the receiver identifier of the user device.

7. The method of claim 6 further comprising:
retrieving a single product identifier from a mapping table, the single product identifier mapped to the beacon ID.

8. The method of claim 6 further comprising:
retrieving multiple product identifiers from a mapping table, the multiple product identifiers mapped to the beacon ID.

9. The method of claim 6, wherein identifying product variations of the one or more store displayed items for sale further comprises:
determining inventory available for the product variations of the one or more store displayed items available for sale by the store.

10. The method of claim 6, wherein providing the display information representing the product variations of the one or more store displayed items available for sale directly to the user device or indirectly to the user device through the beacon device further comprises:
providing the display information to the user device to present the product variations of the store displayed items having inventory available at the store.

11. The method of claim 6, wherein providing the display information representing the product variations of the one or more store displayed items available for sale directly to the user device or indirectly to the user device through the beacon device further comprises:
providing the display information to the user device to present the product variations of the one or more store displayed items having inventory available at an online store associated with the store.

12. The method of claim 6, wherein the communication range with the beacon device represents a distance in which the beacon device may discover the user device using Bluetooth™ Low Energy (BLE) protocols when the user device is located near the one or more store displayed items available for sale by the store.

13. The method of claim 6, wherein automatically receiving the beacon ID associated with the beacon device further comprises:
receiving the beacon ID from the beacon device.

14. The method of claim 6, wherein automatically receiving the beacon ID associated with the beacon device further comprises comprising:
receiving the beacon ID indirectly from the user device.

15. The method of claim 10, further comprising:
receiving a selection from the user device of the product variations of the one or more store displayed items presented; and
providing notification to a merchant system of the selected product variations.

16. The method of claim 10, further comprising:
receiving a selection from the user device of the product variations of the one or more store displayed items; and
providing a request to a merchant system to retrieve from store inventory the selected product variations.

17. A machine readable medium not having any transitory signals and storing instructions that, when executed by at least one processor of a machine, causes the machine to perform operations comprising:
broadcasting, by a beacon device, a message on a wireless network, the message including a beacon identifier (ID) associated with the beacon device, the message broadcasted independent of any signal received by the beacon device;
responsive to a user device coming into a communication range with a beacon device* receiving, by one or more server devices, the beacon ID associated with the beacon device from the beacon device, the beacon device located at a store positioned near one or more store displayed items available for sale, each of the store displayed items having a product identifier;
receiving, by the one or more server devices, an identifier of the user device from the beacon device;
identifying, by the one or more server devices, product variations of the one or more store displayed items available for sale based on one or more of the product identifiers associated with the beacon device; and
providing, by the one or more server devices, display information representing the product variations of the one or more store displayed items available for sale to the user device, via the beacon device, based on the received identifier of the user device.

* * * * *